(12) United States Patent
Nishi et al.

(10) Patent No.: US 7,177,259 B2
(45) Date of Patent: Feb. 13, 2007

(54) OPTICAL HEAD AND OPTICAL RECORDING MEDIUM DRIVE DEVICE

(75) Inventors: Noriaki Nishi, Tokyo (JP); Masaru Tezuka, Kanagawa (JP); Kunika Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 10/493,671

(22) PCT Filed: Aug. 19, 2003

(86) PCT No.: PCT/JP03/10468

§ 371 (c)(1),
(2), (4) Date: Apr. 26, 2004

(87) PCT Pub. No.: WO2004/021340

PCT Pub. Date: Mar. 11, 2004

(65) Prior Publication Data

US 2004/0257961 A1    Dec. 23, 2004

(30) Foreign Application Priority Data

Aug. 29, 2002 (JP) .............................. 2002-251795

(51) Int. Cl.
*G11B 7/00* (2006.01)
(52) U.S. Cl. ................. 369/112.16; 369/112.02; 369/44.23; 369/116; 369/53.27
(58) Field of Classification Search ............ 369/112.16, 369/112.21, 112.02, 44.23, 53.27
See application file for complete search history.

(56) References Cited

U.S. PATENT DOCUMENTS 5,233,175 A * 8/1993 Latta et al. ................ 369/116
5,398,223 A * 3/1995 Tsujioka et al. ........... 369/53.27
5,539,718 A * 7/1996 Hoshi et al. ................ 369/116
5,978,335 A * 11/1999 Clark et al. ............... 369/53.34
6,108,283 A * 8/2000 Fujita et al. ............... 369/44.23
6,791,934 B2 * 9/2004 Shimano et al. .......... 369/44.23
6,940,794 B2 * 9/2005 Hayashi ..................... 369/44.24

FOREIGN PATENT DOCUMENTS

| JP | 60-237648 | 11/1985 |
|----|-----------|---------|
| JP | 4-255925  | 9/1992  |
| JP | 2000-36152 | 2/2000 |

* cited by examiner

Primary Examiner—Thang V. Tran
(74) *Attorney, Agent, or Firm*—Oblon, Spivak, McClelland, Maier & Neustadt, P.C.

(57) ABSTRACT

The present invention is directed to an optical head adapted for performing recording or reproduction of information signals with respect to an optical disc (102), which controls light coupling efficiency with respect to light beams irradiated onto the optical disc (102) by light coupling efficiency adjustable element such as a liquid crystal element (214), etc. in accordance with type of the optical disc (102), recording surface of multi-layer optical disc and/or operation mode to change power of light beams irradiated onto the optical disc (102) to a large extent without excessively increasing change quantity of output power of a semiconductor laser element (212). A beam splitter (218) divides incident light beams of P-polarized light at a predetermined ratio to allow the light beams thus obtained to be incident on a light detector (219) for disc surface power monitor.

164 Claims, 19 Drawing Sheets

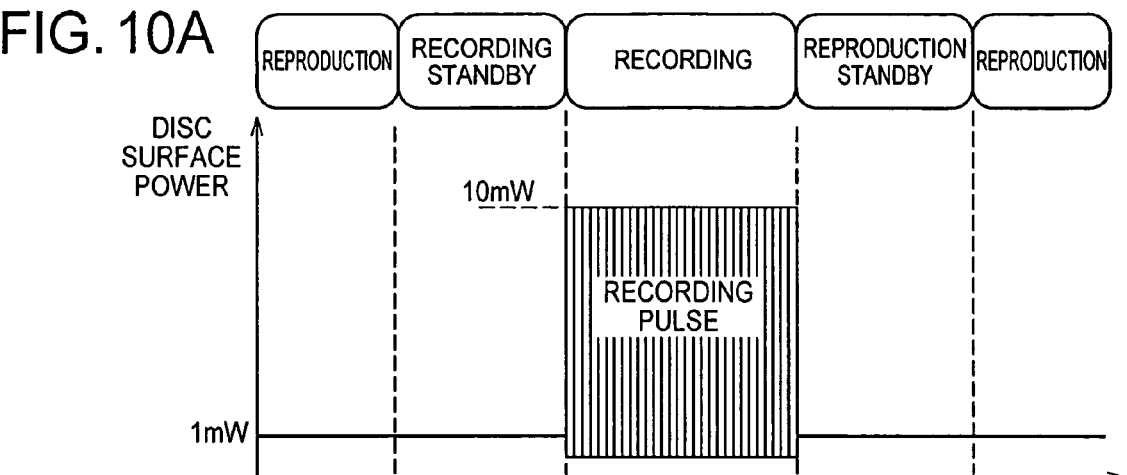
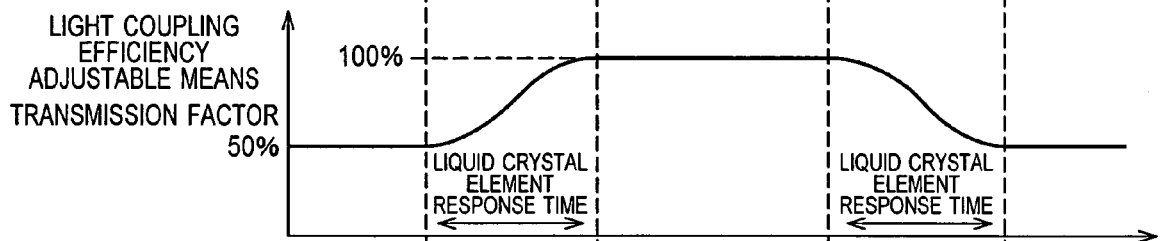
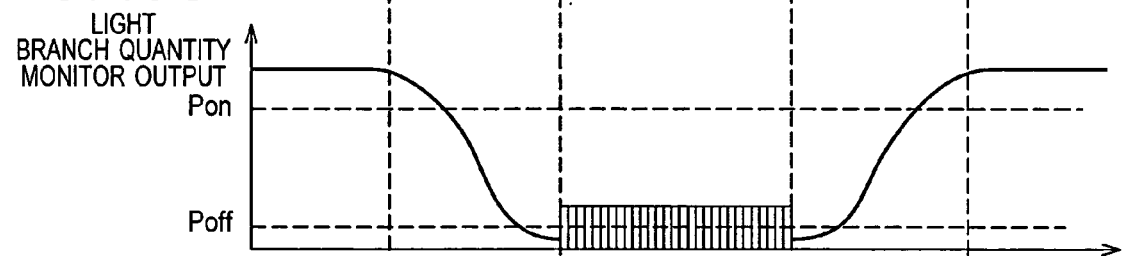
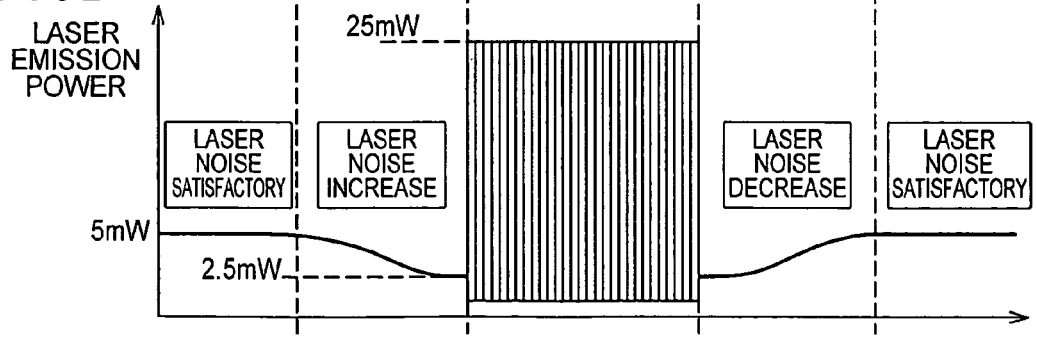

OPTICAL HEAD AND OPTICAL RECORDING MEDIUM DRIVE DEVICE

TECHNICAL FIELD

The present invention relates to an optical head and an optical recording medium drive apparatus which are adapted for recording various information with respect to optical recording media such as optical disc, etc., or performing reproduction of recorded information.

This Application claims priority of Japanese Patent Application No. 2002-251795, filed on Aug. 29, 2002, the entirety of which is incorporated by reference herein.

BACKGROUND ART

Hitherto, optical discs are widely used as an optical recording medium. As the optical disc, there are used an optical disc of the reproduction only type in which information signals have been recorded in advance by micro uneven patterns, and/or an optical disc in which phase change material or magneto-optical material is used for recording layer to permit recording of information signals.

Among them, in an optical recording medium drive apparatus such as optical disc apparatus, etc. using, as recording medium, an optical disc in which recording and reproduction of information can be made, semiconductor laser having relatively large maximum emitting light quantity (optical output maximum rating) has been generally used as light source of the optical head. It is to be noted that light source having large maximum rating is not required in the reproduction (playback) only apparatus. The reason thereof is as follows.

Namely, in the semiconductor laser, generally speaking, in the case where output is small, it is difficult to obtain stable oscillation so that laser noise becomes large. Accordingly, in order to ensure C/N ratio (Carrier to Noise Ratio) at the time of reproduction of information, it is necessary to set light output of laser to a value more than a predetermined value. This value is ordinarily about 2 mW to 5 mW.

Moreover, in optical recording media which permit recording of information, recording is performed by using heat elevation, etc. of recording layer resulting from the fact that light beams are converged onto the recording surface of the optical recording medium. In this case, when attempt is made to satisfy two conditions where recording signal is not deteriorated in the reproduction light power, and stable recording is performed in the recording light power, it is necessary to ensure a predetermined output ratio or more in the light power at the time of reproduction and in the light power at the time of recording. Ordinarily, the maximum power of recording light is greater about 5 to 20 times than the reproduction light power. Further, in such cases that recording is performed at a speed higher than the standard speed, larger output ratio is required.

For these two reasons, the light output maximum rating of light source used for optical head which copes with recording and reproduction, and/or light source used for optical head which performs recording and/or reproduction with respect to plural types of optical recording media is ordinarily 20 mw to 50 mW, and becomes so far as about 100 mW in the optical recording medium which performs recording operation at a high speed which is greater about eight times than the standard speed, e.g., optical disc of the so-called "CD-R/RW" system, etc.

The light source having large light output maximum rating as described above has the problems that not only its realization is very difficult, but also power consumption in the light source becomes large, etc. In addition, when attempt is made to use such light source in the state where light output is small as in the case of time period of reproduction, laser noise becomes large so that satisfactory reproduction characteristic cannot be obtained.

On the other hand, in DVD-ROM disc which is reproduction only DVD (Digital Versatile Disc), etc., optical discs having two recording layers have been already put into practice. Also in regard to optical discs which can perform recording and reproducing operations, optical discs having multi-recording layers such as two layers or four layers are being proposed.

In order to perform recording/reproduction onto these multi-layer optical recording media, recording light power and reproduction light power which are greater about 1.5 to 2 times or more than that of the optical recording medium having only one recording layer have been required. For this reason, in the case where a system which can use optical recording media having single recording layer and multi-recording layers is assumed, ratio between the recording maximum light power when recording is performed onto multi-layer optical recording medium and reproduction light power when reproduction of optical recording medium having single layer is performed approximately becomes double as compared to the case where only the optical recording medium having single recording layer is handled.

Further, when linear velocity of the optical recording medium is changed, recording light power and reproduction light power necessary for light beams which scan the optical recording medium are changed. Namely, when linear velocity of the optical recording medium with respect to light beams becomes large, larger recording and reproduction light powers are required.

As stated above, it is required that the dynamic range of light output of light source should be broader in accordance with future expansion of the recording capacity.

DISCLOSURE OF THE INVENTION

An object of the present invention is to provide a novel optical head and a novel optical recording medium drive apparatus which can eliminate the problems that the prior arts have.

Another object of the present invention is to provide an optical head and an optical recording medium drive apparatus in which ratio between light power at the time of recording mode and light power at the time of reproduction is caused to be small to sufficiently reduce laser noise at the time of reproduction, and light source having small light output maximum rating is used so that satisfactory recording/reproducing characteristics can be obtained.

A further object of the present invention is to provide an optical head and an optical recording medium drive apparatus in which laser noise at the time of reproduction can be sufficiently reduced also with respect to plural types of optical recording media having different optimum recording and/or reproduction light power and/or plural types of optical recording media such as multi-layer optical recording medium, or optical recording medium in which one recording layer is divided into plural recording areas, etc, and satisfactory recording and/or reproducing characteristics can be obtained with respect to respective recording layers of various types of optical recording media, or multi-layer optical recording media and/or respective plural recording areas of one recording layer even by using light source having small light output maximum rating.

An optical head according to the present invention comprises: a light source; light beam converging means for converging light beams emitted from the light source onto an optical recording medium to irradiate them; light separating means for separating light beams emitted from the light source and reflected light beams which have been reflected by the optical recording medium and have been transmitted through the converging means, light detecting means for receiving reflected light beams from the optical recording medium which have been separated by the light separating means; and light coupling efficiency adjustable means provided between the light source and the light separating means and serving to change or adjust light coupling efficiency which is ratio of light quantity converged onto the optical recording medium with respect to total light quantity emitted from the light source.

The light separating means used in the optical head has reflection surface in plane form which is inclined with respect to the optical axis of incident light beams emitted from the light source and incident on the light separating means via the light coupling efficiency adjustable means, wherein incident light beams which are P-polarized light or S-polarized light are incident on the reflection surface to allow a predetermined ratio of the incident light beams to be reflected by the reflection surface or to be transmitted therethrough to separate the predetermined ratio of the incident light beams to send it to a light detector for detecting emitting power of the light source, and to allow the remaining portion of the incident light beams to be transmitted through the reflection surface or to be reflected thereby to allow almost total quantity of reflected light beams from the optical recording medium which are S-polarized light or P-polarized light with respect to the reflection surface to be reflected by the reflection surface or to be transmitted therethrough to send them to the light detecting means.

In the optical head according to the present invention, ratio of power of light source in the recording mode and that in the reproduction mode is reduced so that laser noise at the time of reproduction can be reduced. In addition, laser noise at the time of reproduction can be sufficiently reduced also with respect to plural types of optical recording media having different optimum recording and/or reproduction light powers, and/or plural types of optical recording medium such as multi-layer optical recording medium, or optical recording medium in which one recording layer is divided into plural recording areas.

In the optical head according to the present invention, even in the case where S-polarized light or P-polarized light which is polarization component in the direction perpendicular to the change direction of P-polarized light or S-polarized light is included in light beams which have been passed through light coupling efficiency adjustable means emitted from the light source, since ratio of light beams sent to light detector for detecting light power which is separated by light separating means and is irradiated onto the optical recording medium is not changed, it is possible to precisely perform detection of light power irradiated onto the medium.

The optical recording medium drive apparatus according to the present invention comprises an optical head including a light source, and light converging means for converging light beams emitted from the light source onto the optical recording medium to irradiate them.

In this optical recording medium drive apparatus, the optical head includes light separating means for separating optical paths of light beams emitted from the light source and reflected light beams which have been reflected by the optical recording medium and have been passed through the converging means, light detecting means for receiving reflected light beams from the optical recording medium which have been separated by the light separating means, and light coupling efficiency adjustable means provided between the light source and light separating means and serving to change or adjust light coupling efficiency which is ratio of light quantity converged onto the optical recording medium with respect to total light quantity emitted from the light source.

The light separating means which constitutes the optical head of the optical recording medium drive apparatus has a reflection surface in a plane form which is inclined with respect to the optical axis of incident light beams which are emitted from the light source and are incident on the light separating means via the light coupling efficiency adjustable means, wherein incident light beams which are P-polarized light or S-polarized light are incident on the reflection surface to allow a predetermined ratio of the incident light beams to be reflected by the reflection surface or to be transmitted therethrough to separate reflected or transmitted light beams to send them to a light detector for detecting emission power of the light source, and to allow the remaining portion of incident light beams to be transmitted through the reflection surface or to be reflected thereby to send the remaining light beams to the light converging means to allow substantially total quantity of reflected light beams from the optical recording medium which are S-polarized light or P-polarized light with respect to the reflection surface to be reflected by the reflection surface or to be transmitted thereby to send the reflected or transmitted light beams.

In the optical recording medium drive apparatus according to the present invention, ratio between power of light source in the recording mode and that in the reproduction mode is reduced so that laser noise at the time of reproduction can be sufficiently reduced, and laser noise at the time of reproduction can be sufficiently reduced also with respect to plural types of optical recording media having different optimum recording and/or reproduction light powers, and/or plural types of optical recording media such as multi-layer optical recording media, or optical recording medium in which one recording layer is divided into plural recording areas.

In the optical head used for the optical recording medium drive apparatus according to the present invention, even in the case where S-polarized light or P-polarized light which is polarization component in a direction perpendicular to change direction of the P-polarized light or the S-polarized light is included in light beams which have been emitted from the light source and have been passed through the light coupling efficiency adjustable means, since ratio of light beams which are sent to light detector for detecting light power which is separated by the light separating means and is irradiated onto the optical recording medium is not changed, it is possible to precisely perform detection of light power irradiated onto the optical recording medium.

Still further objects of the present invention and more practical will become more apparent from the description of the embodiments which will be given below with reference to the attached drawings.

BRIEF DESCRIPTION OF THE DRAWINGS

FIGS. 10A to 10D are timing charts showing the state of laser light followed by switching operation between the recording mode and the reproduction mode in the optical recording medium drive apparatus.

BEST MODE FOR CARRYING OUT THE INVENTION

An optical head and an optical recording medium drive apparatus according to the present invention will now be described in detail with reference to the attached drawings.

It is to be noted that since examples which will be described below are preferred practical examples of the present invention, technically preferred various limitations (restrictions) are attached, but the present invention is not limited to these forms as long as there does not exist description to the effect that the present invention is limited.

Figure 1:
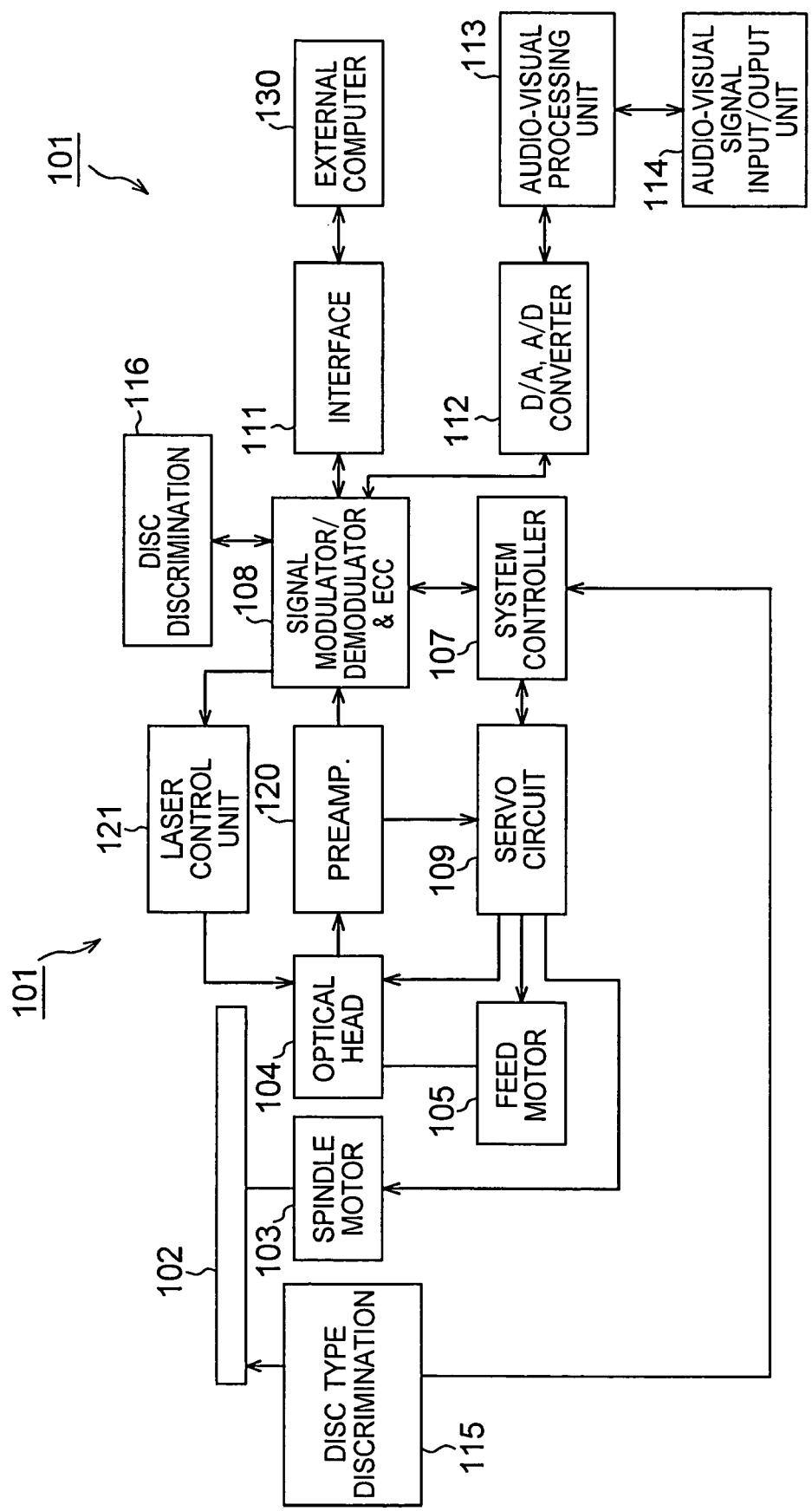
FIG. 1 is a block diagram showing the configuration of an optical recording medium drive apparatus in which light coupling efficiency adjustable element and optical head according to the present invention are assembled.

The optical recording medium drive apparatus 101 according to the present invention comprises, as shown in FIG. 1, a spindle motor 103 as drive means which rotationally operates an optical disc 102 which is optical recording medium, an optical head 104 according to the present invention, and a feed motor 105 for performing feed operation of the optical head 104 in the radial direction of the optical disc 102.

Here, the spindle motor 103 is driven by a system controller 107 and a servo control circuit 109 by which disc type discrimination means which will be described later is constituted, and is driven at a predetermined number of rotations.

As the optical disc 102 used here, there are optical discs of various systems which are recording/reproduction disc, e.g., optical disc of the magneto-optical recording type, optical disc of the phase change type, and optical disc of coloring matter recording. In these optical discs, there are included so-called CD-R/RW disc, DVD-RAM disc, DVD-R/RW disc, DVD-RW disc and Blue-ray disc, etc.

As the optical disc 102, necessary disc may be selectively used from at least two types of optical discs or more having different optimum recording and/or reproduction light powers on the recording surface, and optical disc in which one recording surface is divided into at least two recording areas or more having different optimum recording and/or reproduction light powers, and/or optical disc in which plural recording layers are laminated through transparent base (substrate).

In connection with difference of optimum recording and/or reproduction light powers on the recording surface, there may be employed, in addition to optical disc in which such difference is based on the fact that the recording system in the optical disc itself is different, optical disc having rotation velocity which is n times greater than the standard rotation velocity based on linear velocity with respect to optical head having the standard rotation velocity which is velocity at which the optical disc is rotationally operated.

As the optical disc 102, there may be also used multi-layer optical disc having at least two recording layers or more where optimum recording and/or reproduction powers are different, or are the same. In this case, difference of recording and/or reproduction light powers with respect to respective recording layers takes place by design of the multi-layer optical disc.

As wavelength of recording and/or reproduction light of these optical discs, about 400 nm to about 780 nm are conceivable.

The optical head 104 according to the present invention irradiates light beams onto the recording surface of the recording layer of the optical disc 102 to detect reflected light reflected from the recording surface of the light beams. The optical head 104 detects various light beams as described later on the basis of reflected light from the recording surface of the optical disc 102 to deliver signals corresponding to respective light beams to a preamplifier unit 120. An output of the preamplifier unit 120 is sent to a signal modulating/demodulating element & ECC block 108. The signal modulating/demodulating element & ECC block 108 performs modulation/demodulation of signal and addition of ECC (Error Correcting Code). The optical head 104 performs irradiation of optical beams onto the recording surface of the recording layer of the rotating optical disc 102 in accordance with command of the signal modulating/demodulating element & ECC block 108. By such irradiation of light beams, recording or reproduction of signals with respect to the optical disc 102 is performed.

The preamplifier unit 120 is caused to be of the configuration so as to generate focus error signal, tracking error signal and/or RF signal, etc. on the basis of signals corresponding to respective light beams. Predetermined processing such as demodulation and error correction processing, etc. based on these signals are performed by a servo control circuit 109 and the signal modulating/demodulating element & ECC block 108, etc. in accordance with type of the optical recording medium caused to serve as medium to be recorded or reproduced.

Thus, if demodulated recording signal is, e.g., signal for data storage of computer, such recording signal is sent to information processing device such as external computer 130, etc. through an interface 111. The external computer 130, etc. receives, as reproduction signal, signal recorded on the optical disc 102.

Moreover, if the optical disc 102 is optical disc for the so-called "audio•visual", signal is caused to undergo digital/analog conversion at the D/A converting unit of a D/A, A/D converter 112, and is delivered to an audio•visual processing unit 113. Further, the signal delivered to the audio visual processing unit 113 is caused to undergo audio•visual signal processing at the audio•visual processing unit, and is transmitted to external image pick-up projector equipment through an audio•visual signal input/output unit 114.

The optical head 104 is caused to undergo movement operation until a predetermined recording track on the optical disc 102. Control of the spindle motor 103, control of the feed motor 105, and controls for drive in the focusing direction and drive in the tracking direction of the biaxial actuator which holds object lens serving as light converging means at the optical head 104 are respectively performed by the servo control circuit 109.

The servo control circuit 109 operates the light coupling efficiency adjustable element disposed within the optical head 104 according to the present invention to conduct a control such that light coupling efficiency at the optical head, i.e., ratio between total light quantity of light beams emitted from laser light source such as laser diode, etc. serving as light source and light quantity converged onto the optical disc 102 at the time of recording mode and such efficiency at the time of reproduction mode are different from each other.

A laser control unit 121 controls laser light source at the optical head 104. Particularly, in this example, the laser control unit 121 conducts a control such that output power of the laser light source at the time of recording mode and that at the time of reproduction mode are different from each other.

In the case where the optical disc 102 is selectively used from at least two types of optical discs having different optimum recording and/or reproduction light powers on the recording surface, a disc type discrimination sensor 115 discriminates type of loaded optical disc 102. Here, in two types of optical discs or more, there are included any of optical discs having different recording systems, optical discs having divided recording areas, optical discs having laminated recording surface, and/or optical discs in which relative linear velocity with respect to light beams is different. As the optical disc 102, as described above, optical discs of various systems using light modulation recording and/or various magneto-optical recording media are conceivable. These optical discs also include optical discs having different optimum recording and/or reproduction light powers on the recording surface. The disc type discrimination sensor 115 detects surface reflection factor and/or other differences in form and external appearance, etc. of the optical disc 102.

The system controller 107 discriminates type of the optical disc 102 on the basis of detection result sent from the disc type discrimination sensor 115.

Further, as a technique of discriminating type of the optical recording medium, in the optical recording medium accommodated within the cartridge, it is conceivable that detection hole is provided at the cartridge. In addition, it is conceivable to detect disc type, recommended recording power and recommended reproduction power recorded in catalog information (Table of Contents: TOC) recorded at pre-mustard pits or grooves, etc. existing at innermost circumference to set recording and reproduction light powers suitable for recording and reproduction of the optical recording medium.

The servo control circuit 109 serving as light coupling efficiency control means is controlled by the system controller 107 to thereby control light coupling efficiency at the optical head 104 by type of loaded optical disc 102 in accordance with discrimination result of the disc type discrimination sensor 115.

In the case where there is used optical disc having different optimum recording and/or reproduction light powers and such that the recording surface is divided into at least two recording areas or more, recording area where attempt is made to perform recording and/or reproduction is detected by recording area discrimination means. In the case where plural recording areas are concentrically divided in accordance with distance from the center of the optical disc 102, servo control circuit 109 can be used as the recording area discrimination means. The servo control circuit 109 detects, e.g., relative position between the optical head 104 and the optical disc 102 (the case where position is detected on the basis of address signal recorded on the disc 102 is included), thereby making it possible to discriminate recording area where attempt is made to perform recording and/or reproduction. Further, the servo control circuit 109 controls light coupling efficiency at the optical head 104 in accordance with discrimination result of the recording area where attempt is made to perform recording and/or reproduction.

Further, in the case where the optical disc 102 is multilayer optical disc having different recording and/or reproduction light powers and at least two recording layers or more, recording layer where attempt is made to perform recording and or reproduction is discriminated by recording surface discrimination means. As the recording surface discrimination means, servo control circuit 109 may be used. The servo control circuit 109 detects, e.g., relative position between the optical head 104 and the optical disc 102, thereby making it possible to detect recording layer where attempt is made to perform recording and/or reproduction. In addition, the servo control circuit 109 controls the light coupling efficiency at the optical head 104 in accordance with discrimination result of the recording layer where attempt is made to perform recording and/or reproduction.

There information in connection with the type, the recording area and the recording layer of the optical disc can be discriminated also by reading catalog information such as the so-called TOC, etc. recorded on respective optical discs.

Figure 2:
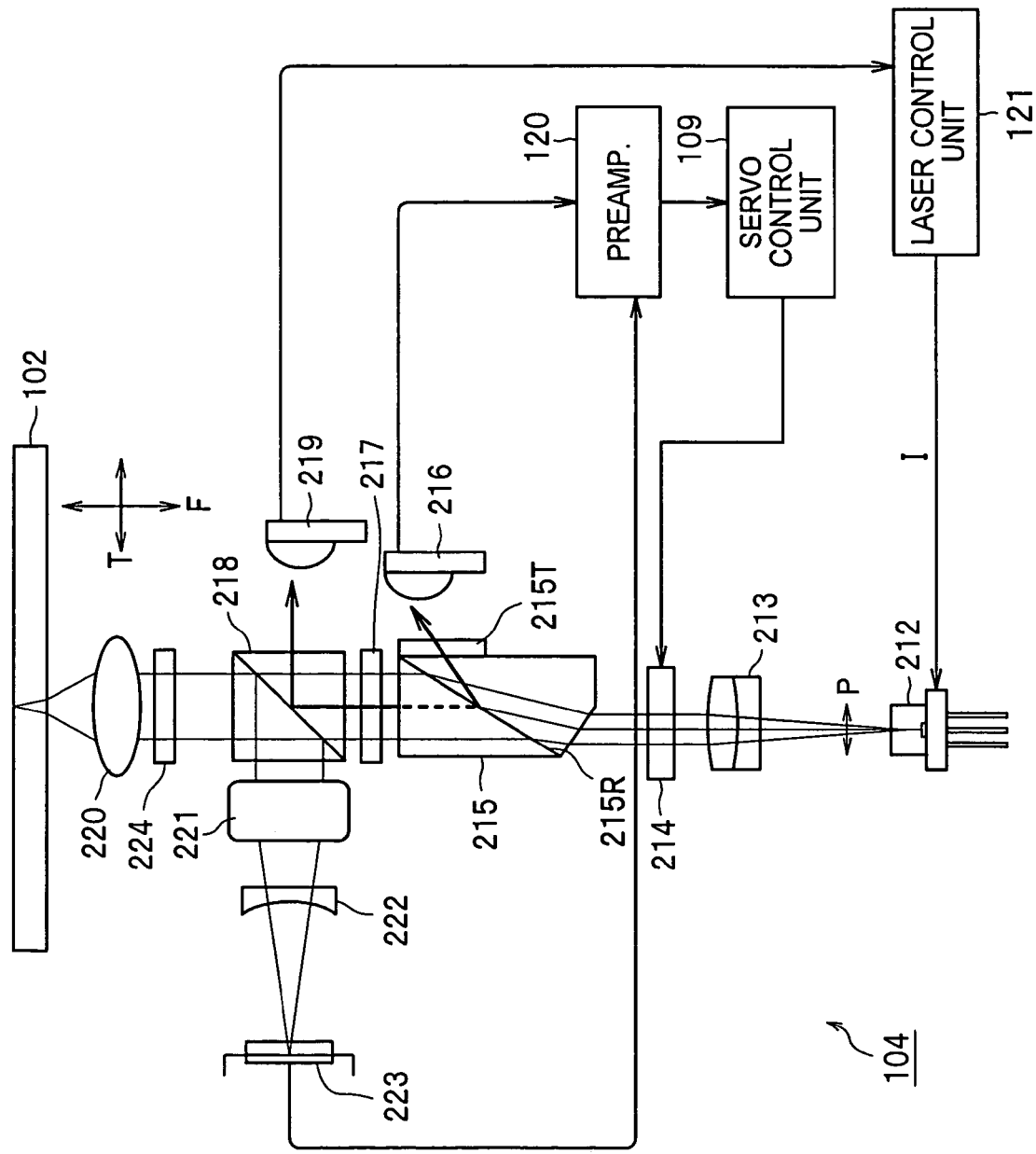
FIG. 2 is a side view showing an optical head according to the present invention used in the optical recording medium drive apparatus.

The optical head according to the present invention used in the above-described optical recording medium drive apparatus 101 comprises, as shown in FIG. 2, a semiconductor laser element 212 serving as light source, a collimator lens 213, a liquid crystal element 214 and an anamorphic prism 215 having polarized beam splitter film surface 215R which constitute light coupling efficiency adjustable means, a phase plate 217 constituted by, e.g., half-wave plate, etc. serving as polarization state adjustment means, a beam splitter 218 serving as light separating means, a detection element 219 for FAPC (Front Auto Power Control) serving as light detector for detecting emission power of the semiconductor laser element 212, a quarter wavelength plate 224, an object lens 220 serving as light converging means, a detection lens 221, a multi-lens 222, and a light detection element, and is caused to be of the configuration in which these respective optical parts are individually mounted.

Thereafter, explanation will be given in connection with the fact that also in the case where the dynamic range of disc surface power totally required is further extended in order to cope with plural types of recording media, the dynamic range required for the semiconductor laser element 212 can be held down to small value by using the light coupling efficiency adjustable element. In this case, the operation states of the light coupling efficiency adjustable element are selectively used in accordance with recording and/or reproduction powers of respective recording media without being limited to switching between recording mode and reproduction moce.

At this optical head 104, diffused light of linearly polarized light emitted from the semiconductor laser element 212 is incident on collimator lens 213 so that it is changed into parallel light beams. The parallel light beams thus obtained are incident on the liquid crystal element 214. Further, light beams which have been passed through the liquid crystal element 214 are incident in order on anamorphic prism 215, phase plate 217 and bean splitter 218.

The anamorphic prism 215 shapes the cross sectional shape of light beams which have been emitted from the semiconductor laser element 212 from elliptical shape to substantially circular shape. Namely, light beams which have been emitted from the semiconductor laser element 212 are linearly polarized light, and have elliptical light intensity distribution where polarization direction indicated by arrow P in FIG. 2 is caused to be short diameter direction. The light beams are incident from the incident surface of the anamorphic prism 215 inclined with respect to the short diameter direction of cross sectional shape, whereby the beam diameter is extended with respect to this short diameter direction. Thus, the optical beams thus processed are shape into optical beams having substantially circular intensity distribution.

The incident light beams incident on the beam splitter 218 via the anamorphic prism 215 and the phase plate 217 are caused to be substantially P-polarized light with respect to reflection surface in plane form inclined with respect to the optical axis of incident light beams that the beam splitter 218 has. It is to be noted that the phase plate 217 is rotationally adjusted around the optical axis so that polarization direction of incident light beams is caused to be P-polarized light with respect to the reflection surface of the beam splitter 218.

At this beam splitter 218, incident light beams are transmitted through the reflection surface at a predetermined percentage, e.g., a predetermined percentage less than 95%, and is incident on the quarter wavelength plate 224. Here, a portion of, e.g., predetermined percentage of 5% or more of incident light beams reflected by the reflection surface is incident on detection element 219 for FAPC which will be described later. The incident light beams which have been transmitted through the beam splitter 218 are changed into circular polarized light as the result of the fact that they are passed through the quarter wavelength plate 224, and are converged onto the recording surface of the optical disc 102 by the object lens 220.

The reflected light beams which have been reflected on the recording surface of the optical disc 102 are transmitted through the quarter wavelength plate 224 via the object lens 220, whereby they are caused to be linearly polarized light in a direction perpendicular to polarization direction of light beams of emitting (outgoing) optical path. The light beams thus obtained return to the beam splitter 218. At this time, reflected light beams are caused to be substantially S-polarized light with respect to the reflection surface of the beam splitter 218. Substantially total quantity thereof is reflected by the reflection surface. Thus, the reflected light beams thus obtained are separated with respect to the optical path from the semiconductor laser element 212. The reflected light beams which have been separated with respect to the optical path from the semiconductor laser element 212 are converged into convergent light by the detection lens 221. Astigmatism for obtaining focus error signal by the astigmatism method is rendered to the convergent light by multi-lens 222. The light thus obtained is incident on light detection element 223. On the basis of signal that the light detection element 223 receives and outputs, RF signal, focus error signal and tracking error signal, etc. are generated.

At this optical head 104, light beams which have been emitted from the semiconductor laser element 212 are passed through the liquid crystal element 214, and are then caused to undergo processing such that light coupling efficiency is suitably adjustably controlled by action of the liquid crystal element 214 serving as light coupling efficiency adjustable element and polarized beam splitter film surface 215R of the anamorphic prism 215. At the optical disc of the same type, the same recording area or the same recording surface, when operation mode shifts from recording mode to reproduction mode, light beams having light coupling efficiency lower than that at the time of recording mode are incident on the optical disc 102. In addition, when the operation mode shifts from the reproduction mode to the recording mode, light beams having light coupling efficiency caused to be lower than that at the time of reproduction mode are incident on the optical disc 102.

It is to be noted that the liquid crystal element is not limited to liquid crystal element functioning as wave-plate, but any liquid crystal which can adjust (vary) the state of polarized light incident on the beam splitter, e.g., liquid crystal of the twisted nematic type, etc. used in display, etc. may be used.

At this optical head 104, current I for driving semiconductor laser chip (not shown) within semiconductor laser element 212 is delivered from laser control unit 121 of optical head 104. It is to be noted that the laser control unit 121 may be positioned at the outside of the optical head 104, or may be mounted at the optical head 104.

The liquid crystal element 214 changes polarization state of transmitted light on the basis of applied voltage. The applied voltage to the liquid crystal element 214 is controlled by servo control unit 109. Light beams which have been transmitted through the liquid crystal element 214 are incident on anamorphic prism 215 under the condition where the state of polarization has been changed.

The polarized beam splitter film surface 215R of the anamorphic prism 215 is adapted to allow P-polarized light to be transmitted therethrough substantially at 100%, and to allow S-polarized light to be reflected substantially at 100%. Accordingly, when phase difference given to transmitted light beams by the liquid crystal element 214 is just N wavelength (N is integer) (i.e., at the time of recording mode), light beams of substantially 100% are transmitted through the polarization beam splitter film surface 215R of the anamorphic prism 215.

On the other hand, when phase difference given to transmitted light beams by the liquid crystal element 214 is in the state deviating from N wavelength (i.e., at the time of reproduction mode), polarization direction is rotated so that light beams of a predetermined percentage are transmitted through polarized beam splitter film surface 215R of the anamorphic prism 215, and the remaining light beams are reflected by the polarization beam splitter film surface 215R. For example, in the case where phase difference given to transmitted light beams by the liquid crystal element 214 deviates from the N wavelength, polarization direction is rotated by 45 degrees. As a result, light beams of substantially 50% are transmitted through the polarized beam splitter film surface 215R of the anamorphic prism 215, and the remaining light beams of substantially 50% are reflected by the polarized beam splitter film surface 215R.

Figure 3:
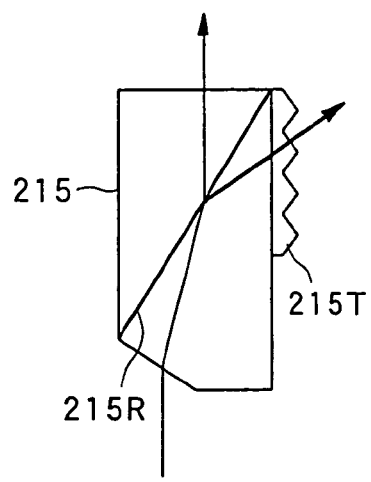
FIG. 3 is a side view showing the configuration of anamorphic prism constituting the optical
Figure 4:
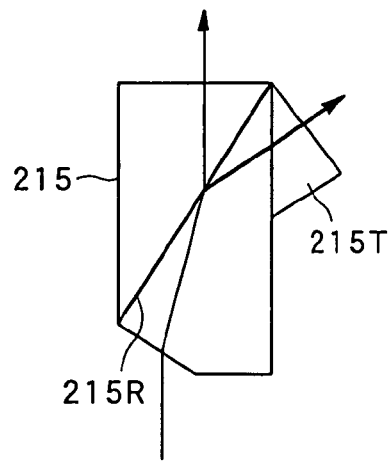
FIG. 4 is a side view showing another example of anamorphic prism.
Figure 5:
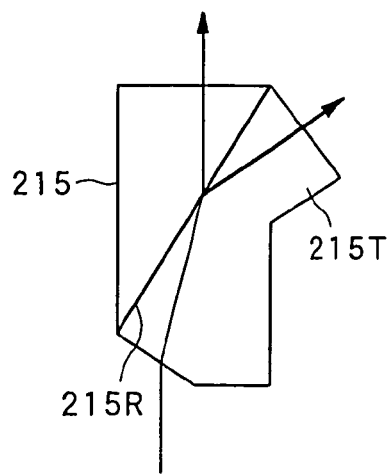
FIG. 5 is a side view showing a further example of the configuration of anamorphic prism.

The light beams which have been reflected at the polarizaed beam splitter film surface 215R of the anamorphic prism 215 are received by a light detection element 216 for light branch quantity monitor serving as light coupling efficiency detecting means via a total reflection prevention element (light emitting (outgoing) prism) 215T. The total reflection prevention element 215T is adapted to prevent that light beams which have been reflected at the polarization beam splitter film surface 215R are totally reflected at the inner surface of the anamorphic prism 215. As shown in FIG. 3, the total reflection prevention element 215T is formed in a stair-step form having plural surfaces substantially perpendicular to light beams, and is disposed in the state optically closely in contact with anamorphic prism 215. This total reflection prevention element 215T may be adapted so that it is formed as shown in FIG. 4 as triangular prism having plane substantially perpendicular to light beams and is disposed in the state optically closely in contact with the anamorphic prism 215, or is formed as shown in FIG. 5 in the state integral with the anamorphic prism 215.

An output of the light detection element 216 for light branch quantity monitor is caused to be output corresponding to product of emitting output of semiconductor laser element 212 and light branch percentage at the polarized beam splitter film surface 215R of the anamorphic prism 215, and is caused to be output substantially corresponding to light coupling efficiency at this optical head 104. At this optical head, there exists the relationship that when light coupling efficiency is high, light quantity percentage incident on the detection element 216 for light branch quantity monitor is decreased, while when the light coupling efficiency is low, light quantity percentage incident on the light detection element 216 for light branch quantity monitor is increased. The light quantity incident on the light detection element 216 for light branch quantity monitor is quantity proportional to 100%–[transmission factor (%) of light coupling efficiency adjustable means]. As shown in FIG. 2, an output of this light detection element 216 for light branch quantity monitor is sent to the preamplifier 120.

Light beams which have been transmitted through the anamorphic prism 215 are incident on the beam splitter 218. The beam splitter 218 separates, at a predetermined percentage (ratio), light beams emitted from the semiconductor laser element 212 into light beams actually outgoing to the recording surface of the optical disc 102 through object lens 220 and light beams incident on detection element 219 for FAPC for monitoring light quantity of light beams outgoing to the recording surface. An output of the detection element 219 for FAPC is sent to laser control unit 121 so that the operation of auto power control is executed. Namely, the laser control unit 121 controls emitting output of the semiconductor laser element 212 so that output from the detection element 219 for FAPC becomes equal to a predetermined value. By this control, output of irradiation light beams on the recording surface of the optical disc 102 (disc surface power) is caused to be constant. It is to be noted that output value of irradiation light beams caused to be a predetermined value on the recording surface of the optical disc 102 takes different value in dependency upon recording mode and reproduction mode as described later, and takes different value also in dependency upon type of the optical disc, etc. Additionally, in the case of the light modulation recording system, pulse emission is obtained.

As described above, light beams from the semiconductor laser element 212 which have been transmitted through the beam splitter 218 are incident on the object lens 220. The object lens 220 irradiates incident light in the state where it is focused onto a certain point of the recording surface of the optical disc. This object lens 220 is driven in the focus direction indicated by arrow F in FIG. 2 and in the tracking direction indicated by arrow in FIG. 2 by biaxial actuator (not shown).

Meanwhile, in the optical head 104, since P-polarized light with respect to the reflection surface is separated at a predetermined percentage (ratio) at the beam splitter 218, even in the case where S-polarized light component with respect to the reflection surface is included somewhat in incident light beams onto the beam splitter 218, it is possible to precisely monitor light quantity of light beams outgoing toward the recording surface of the optical disc 102. Accordingly, when the light coupling efficiency is adjustably controlled by control of the liquid crystal element 214, there is no possibility that output of irradiation light beams onto the recording surface of the optical disc 102 is greatly changed from a scheduled output.

Namely, in the case where the optical path is branched into the optical path at the object lens 220 side (optical disc 102 side) and the optical path at the detection element 219 for FAPC side with respect to light beams which have been passed through the light coupling efficiency adjustable element composed of liquid crystal element 214 and the anamorphic prism 215 to perform APC (Auto Power Control) operation, it is also conceivable to perform branch of optical path by using the configuration of the wave-plate and PBS (Polarized Beam Splitter film).

In the case where the configuration of liquid crystal element 214 (wave-plate type liquid crystal, twisted nematic type liquid crystal and phase plate, etc.) and PBS (Polarized Beam Splitter film) is used as the light coupling efficiency adjustable element, polarization state of emitting light from the PBS is also changed as the result of the fact that unnecessary component which does not exist if the PBS (Polarized Beam Splitter film) of the light coupling efficiency adjustable element do exist in practice, so polarization state of incident light on the PBS for branching the optical path would be changed. It is to be noted that the unnecessary component takes place because transmission factor Ts of the S-polarized light is not zero in the case where light coupling efficiency conversion (attenuate) is performed with respect to transmitted light of PBS of the light coupling efficiency adjustable element, and because the reflection factor Rp of P-polarized light is not zero in the case where light coupling efficiency conversion (attenuate) is performed with respect to reflected light in PBS of the light coupling efficiency adjustable element.

Namely, there takes place inconvenience such that light quantity percentage (ratio) when the optical path is branched is changed by change of polarization state of emitting (outgoing) light from PBS of the light coupling efficiency adjustable element so that the disc surface power changes in the APC operation.

For example, in the case where the configuration of half wave-plate+PBS is used and ratio between transmitted light quantity and reflected light quantity in this PBS is assumed to be 3:1, when transmission factor Ts of S-polarized light in the PBS is changed, change between disc surface power at the time of light coupling efficiency and that at the time of non-conversion thereof takes place. Here, when the transmission factor Ts of S-polarized light in the PBS is assumed to be 0.5%, the light quantity branch ratio is changed. As a result, disc surface power when the APC operation is executed is changed by about 25% at the time of light coupling efficiency conversion and at the time of non-conversion thereof.

The reason thereof is as follows. While the light quantity ts of transmitted S-polarized light in the PBS is very small in terms of light intensity, the light quantity ts becomes equal to $\sqrt{ts} \approx 0.07$ when the transmission factor Ts is 0.5% in terms of amplitude. For example, deviation in the polarization direction when light beams of polarization direction which forms 45 (deg) with respect to P-polarized light is emitted through the PBS film deviates by about 4° (deg) with respect to pure P-polarized light. For this reason, in the configuration in which polarization direction of light beams incident on the PBS is changed to thereby adjust light quantity branch ratio to detection element 219 for FAPC, the branch ratio is greatly changed.

On the other hand, in the optical head according to the present invention as described above, branch between optical path of the object lens 220 side (optical disc 102 side) and optical path of detection element 219 side for FAPC is performed by using "P-polarized light separation type BS (Beam Splitter)" 218 in the case where light beams outgoing toward the object lens 220 side are transmitted light, and are performed by using "P-polarized light separation type BS (Beam Splitter) in the case where light beams outgoing toward the object lens 220 side are reflected light, thereby permitting change of light quantity ratio when the optical path is branched to be very small.

Figure 9:
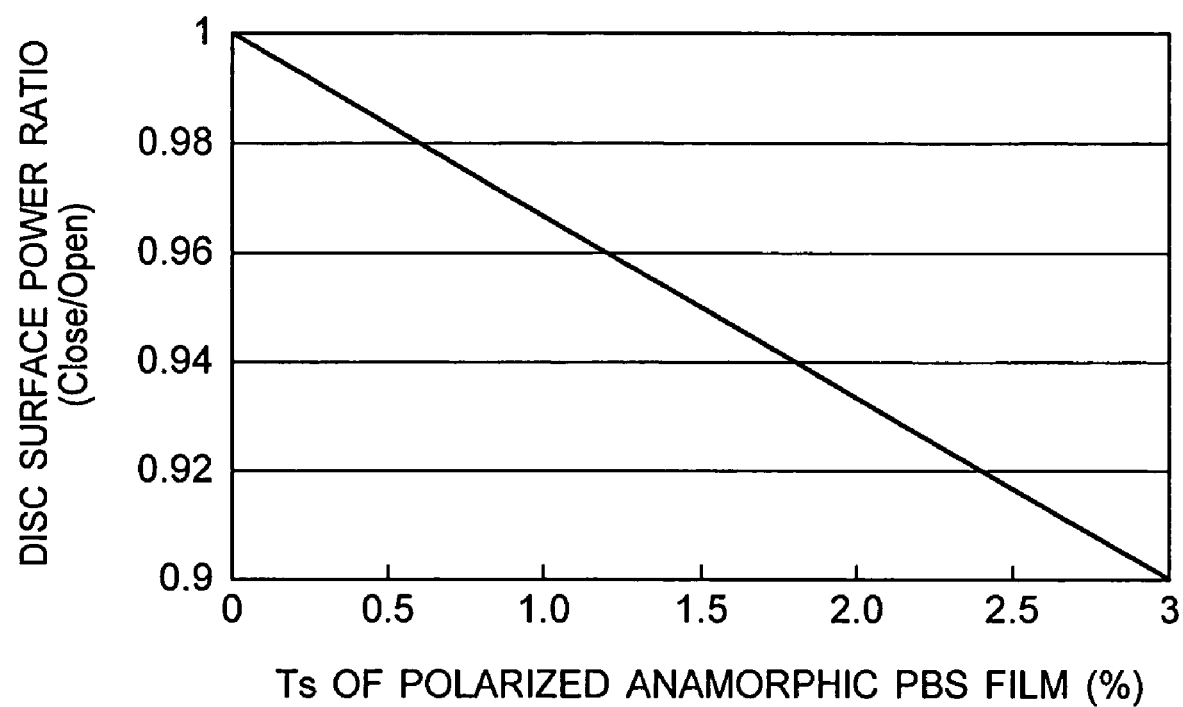
FIG. 9 is a graph showing the relationship between S-polarized light transmission factor Ts of PBS and disc surface power ratio at the time of light coupling efficiency conversion and at the time of non-conversion thereof in the optical head according to the present invention.

With respect to the relationship between transmission factor Ts of S-polarized light in the PBS of the light coupling efficiency adjustable element 218 in the case where ratio between transmitted light quantity and reflected light quantity in the beam splitter 18 is similarly caused to be 3:1 and change between disc surface power at the time of light coupling efficiency conversion and at the time of non-conversion thereof in the above-described configuration, for example, as shown in FIG. 9, even if transmission factor Ts of the S-polarized light is assumed to be about 0.5%, change of the disc surface power takes only about 25%, and even if the transmission factor Ts is about 3%, change of disc surface power takes about 10%.

Also in the case where such configuration of the optical head according to the present invention is employed, there is not nothing but the influence by change of incident polarized light onto the beam splitter 218 which is P-polarized light (S-polarized light). Also in this case, for example, change of disc surface power of about several % takes place.

In view of the above, phase plate 217 is disposed on the optical path before polarized light is incident onto the beam splitter 218 to rotationally adjust the optical axis direction of this phase plate 217 around the optical axis of incident light beams to thereby optimize the state of polarized light incident on the beam splitter 218, thus making it possible to prevent that the disc surface power is changed by polarization state of emitting (outgoing) light from PBS of the light coupling efficiency adjustable element.

The configuration adapted for optimizing the state of polarized light incident on the beam splitter 218 by using the phase plate 217 in this way can be applied also to the case where the light coupling efficiency adjustable element is constituted by phase plate rotationally operated around the optical axis by the rotation operation mechanism and PBS.

The optimization of the state of polarized light by using the phase plate 217 can be applied not only to combination with the light coupling efficiency adjustable element as described above, but also to adjustment of light coupling efficiency to suppress unevenness of the characteristic, e.g., at the time of forwarding (shipping) of the optical head.

In the optical recording medium drive apparatus, in the case where light coupling efficiency of light emitted from the semiconductor laser 212 and guided to the optical disc 102 is assumed to be CEW (Coupling Efficiency write) at the time of recording mode, and light coupling efficiency of light emitted from the semiconductor laser 212 and guided to the optical disc 102 is assumed to be CER (Coupling Efficiency read) at the time of signal reproduction mode, the following relationship holds.

CEW>CER

In addition, also in the case where light coupling efficiency of light guided to the optical disc 102 changes in dependency upon type of optical recording medium, this similarly applies.

Accordingly, there is employed an approach to perform switching control of light coupling efficiency in the light coupling efficiency adjustable element at the time of recording and that at the time of reproduction, and such light coupling efficiency at the time of change of type of the optical recording medium, thereby making it possible to greatly change level of light beams irradiated onto the recording surface of the optical disc 102 in dependency upon the record mode time and the reproduction mode time, and in accordance with change of type of the optical recording medium even if ratio between output power at the time of recording mode and that at the time of reproduction mode is not extremely increased at the semiconductor laser element 212. In addition, the light coupling efficiency is adjustably controlled in dependency upon type of optical disc, difference of the recording area or difference of the recording surface, or in accordance with light power on the recording surface at the time of recording and/or reproduction which are to be optimum. The light coupling efficiency becomes large according as light power on the recording surface which is to be optimum becomes large. It is to be noted that there are cases in dependency upon the configuration of the optical system where the relationship between light coupling efficiency and light power on the recording surface is opposite to the above.

As described above, in this optical recording medium drive apparatus, light of optimum level is irradiated onto the recording surface of the optical disc with respect to the time of recording mode and the time of reproduction mode, or type, recording area or recording surface of selected optical disc to permit recording or reproduction. Thus, satisfactory recording and reproduction characteristics can be obtained.

Explanation will now be given below in detail in connection with the operation of the light coupling efficiency adjustable element in the present invention.

First, when light coupling efficiency in the case where light coupling efficiency adjustable element is not used is assumed to be CE0, and transmitted light ratio of the light coupling efficiency adjustable element at the time of signal recording is assumed to be TW and that transmitted light ratio at the time of signal reproduction is assumed to be TR, the following relationship holds.

(Light Coupling Efficiency at the Time of Signal Recording)

$$CEW = CE0 \times TW$$

(Light Coupling Efficiency at the Time of Signal Reproduction)

$$CER = CE0 \times TR$$

Moreover, when necessary recording surface light converging light quantity at the time of signal recording is assumed to be PW, and that necessary recording surface converging quantity at the time of signal reproduction is assumed to be PR, and necessary output at the light source at the time of recording is assumed to be LDW and that necessary output at the time of reproduction is assumed to be LDR, the following relationship holds.

(At the Time of Signal Recording)

$$LDW = PW/CEW = PW/(CE0 \times TW)$$

(At the Time of Signal Reproduction)

$$LDR = PR/CER = PR/(CE0 \times TR)$$

Then, the dynamic range LDW/LDR required for light output of the light source is indicated as follows.

$$LDW/LDR = (PW/PR) \times (TR/TW)$$

It is to be noted that in the case where the light coupling efficiency adjustable element is not used, the dynamic range is similar to that in the case of TR=TW. As stated above, in this optical recording medium drive apparatus, the dynamic range required for light output of the light source can be changed by quantity corresponding to ratio of transmitted light percentage of the light coupling efficiency adjustable element.

Then, the case where plural types of optical recording media are used will be considered. As optical recording media which are assumed, various optical recording media such as multi-layer optical disc, and/or high linear velocity recording optical recording medium, etc. are conceivable as described above.

It is assumed that semiconductor laser is used as the light source, and light output when laser oscillation becomes stable so that laser noise is sufficiently reduced is 4 mW and light output maximum rating is 60 mW in this example.

Further, it is assumed that converging light quantities PW(A), PR(A) onto the recording surface which are required from the characteristic of the optical recording medium A (first type of optical disc) are as follows.

PW(A)=20 mW

PR(A)=2 mW

It is assumed that converging light quantities PW(B), PR(B) onto the recording surface which are required from the characteristic of the optical recording medium B (second type of optical disc) are as follows.

PW(B)=10 mW

PR(B)=1 mW

In this case, when it is assumed that the light coupling efficiency adjustable means is not used, the dynamic range of light output of the light source can be indicated as follows.

$$[\text{dynamic range of light output of light source}] = 60 \text{ mW}/4 \text{ mW} = 15$$

Further, the dynamic range of required light output on the recording surface of the optical disc can be indicated as follows.

$$[\text{dynamic range of required light output}] = LDW(A)/LDR(B)$$
$$= PW(A)/PR(B)$$
$$= 20 \text{ mW}/1 \text{ mW}$$
$$= 20$$

Namely, since the dynamic range of light output of the light source is smaller than the dynamic range of the required light output, in the case where this light source is used as it is, satisfactory recording and reproduction cannot be performed.

On the other hand, when the light coupling efficiency adjustable means in the optical recording medium drive apparatus according to the present invention is used, the dynamic range is as follows.

When it is assumed that passed light percentages T1 and T2 of the light coupling efficiency adjustable means are respectively 100% and 50%, and the recording time of the optical recording medium A is T1 and the reproduction time of the optical recording medium B is T2, the dynamic range of the required light output can be indicated as follows.

$$\begin{aligned}[\text{dynamic range of required light output}] &= LDW(A)/LDR(B) \\ &= (PW(A)/PR(B)) \times \\ &\quad (T2/T1)(20\text{ mW}/1\text{ mW}) \times \\ &\quad (50\%/100\%) \\ &= 10\end{aligned}$$

As stated above, since the dynamic range of the required light output is smaller than the dynamic range of light output of the light source, recording with respect to the first type of optical disc (A) and reproduction of second type of recording disc (B) can be made within the dynamic range of light output of the light source.

In this case, when the design of the optical system is set so that CE0=40%, the following relationships hold.

[Light Coupling Efficiency at the time of Recording of Optical Recording Medium A Signal]

$CE1=CE0 \times T1=40\%$

[Light Coupling Efficiency at the time of Reproduction of Optical Recording Medium B Signal]

$CE2=CE0 \times T2=20\%$

Accordingly, the required light source light outputs are as follows.

[At Time of Recording Optical Recording Medium A Signal]

$LDW(A)=PW(A)/CE1=20\text{ mW}/40\%=50\text{ mW}$

[At Time of Reproducing Optical Recording Medium B Signal]

$LDR(B)=PR(B)/CE2=1\text{ mW}/20\%=5\text{ mW}.$

As stated above, recording can be made at light output 50 mW having margin with respect to light output maximum rating 60 mW, and satisfactory reproduction can be made at light output 5 mW having margin also with respect to light output 4 mW where laser noise is sufficiently small.

At this time, light outputs at the time of reproducing optical recording medium A signal are as follows.

$LDR(A)=PR(A)/CE1="2\text{ mW}/40\%=5\text{ mW}$ $LDR(A)=PR(A)/CE2=2\text{ mW}/20\%=10\text{ mW}$ Light outputs at the time of recording optical recording medium B signal are as follows.

$LDW(B)=PW(B)/CE1=10\text{ mW}/40\%=25\text{ mw}$ $LDW(B)=PW(B)/CE2=10\text{ mW}/20\%=50\text{ mW}$ In this case, either CE1 or CE2 may be used as the light coupling efficiency.

It is to be noted that since a predetermined time is required as described later in the case where the light coupling efficiency is changed at the time of recording and/or reproduction, it can be judged that it is more simple to use CE1 at recording and reproduction with respect to the optical recording medium A, and to use CE2 at recording and reproduction with respect to the optical recording medium B.

If information of recommended recording/reproduction power is recorded in advance on the optical recording medium, even when any medium is loaded, such medium can be similarly handled.

Here, it is now assumed that recommended recording power of a certain medium is PW0 and recommended reproduction power thereof is PR0, light coupling efficiency when passed light percentage at light coupling efficiency adjustable means is substantially 100% is 40%, light coupling efficiency when passed light percentage at the light coupling efficiency adjustable means is lowered is 20%, the range of assumed PW0 is 9 mW to 22.5 mW, and the range of assumed PR0 is 0.9 to 2.25 mW.

Figure 6:
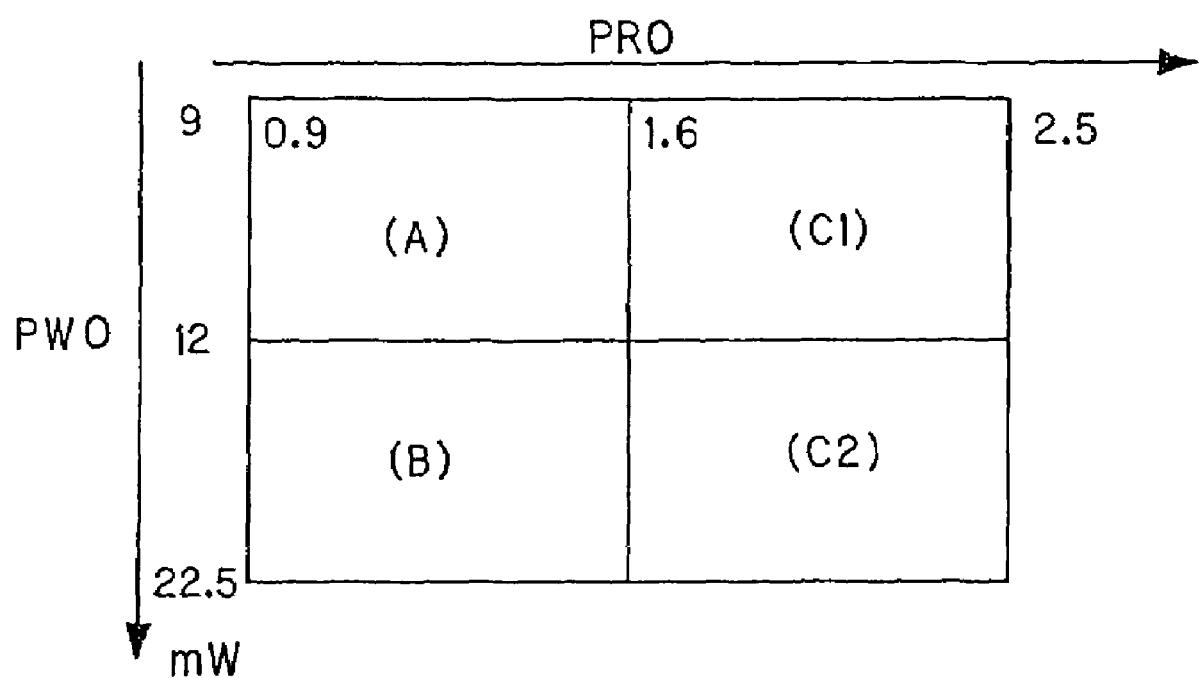
FIG. 6 is a graph showing the relationship between recommended reproduction power and recommended recording power with respect to optical recording medium used in the optical recording medium drive apparatus.
Figure 7:
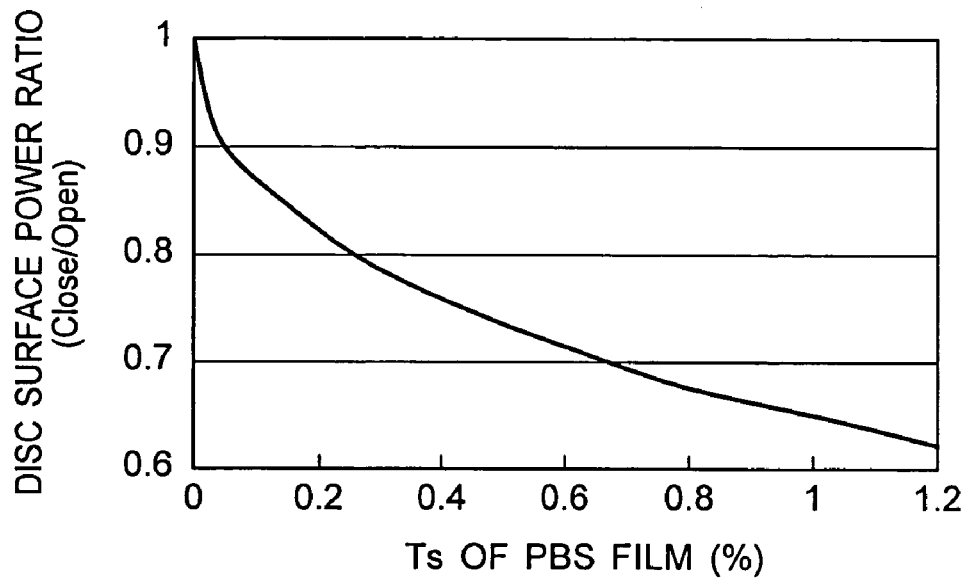
FIG. 7 is a graph showing the relationship between S-polarized light transmission factor Ts of PBS and disc surface power ration at the time of light coupling efficiency conversion and at the time of non-conversion thereof in the case where light separating means is constituted by half-wave plate and PBS.
Figure 8:
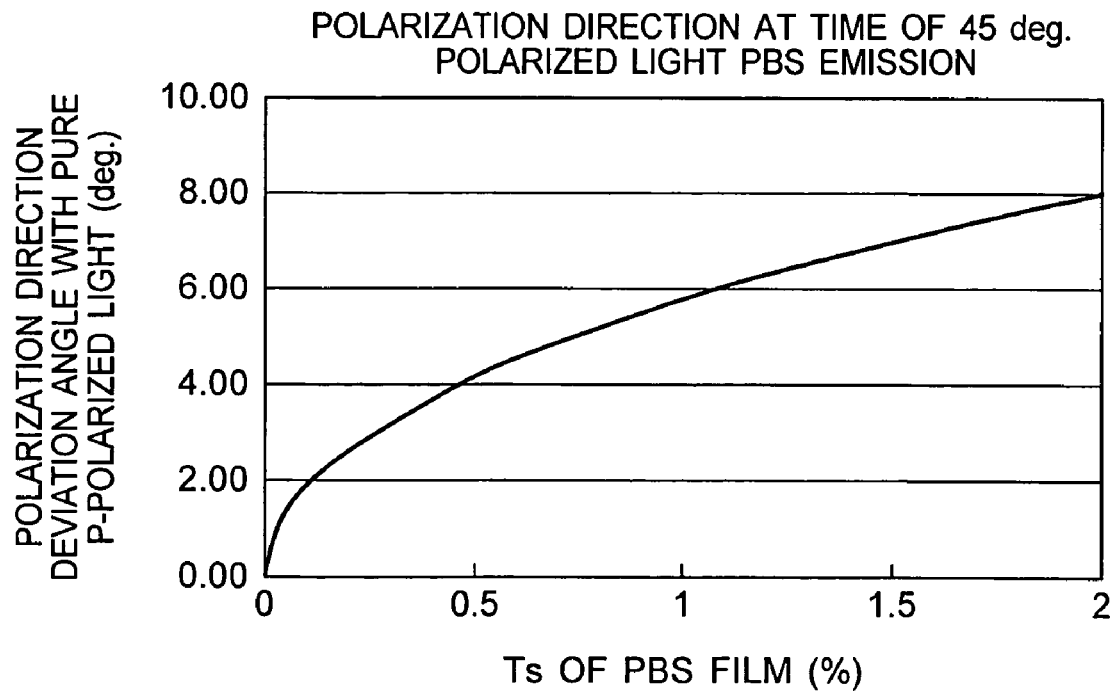
FIG. 8 is a graph showing the relationship between S-polarized light transmission factor Ts of PBS and deviation angle in the polarization direction of PBS emission light beams in the case where light separating means is constituted by half-wave plate and PBS.

Further, as shown in FIG. 6, there is employed an approach to discriminate whether combination of PR0, PW0 which have been read from the optical recording medium exists in any one of four areas of (A), (B), (C1), (C2) to determine, in accordance with respective discrimination results, how attenuate state (passed light percentage at the light coupling efficiency adjustable means) in the recording mode and in the reproduction mode is changed.

Namely, when the dynamic range of the light source is considered, it is necessary at $PR0 \leq 1.6$ to lower transmitted light percentage at the light coupling efficiency adjustable means, and it is necessary at $PW0 \geq 12$ to raise passed light percentage at the light coupling efficiency adjustable means.

Accordingly, since it is necessary to lower passed light percentage at the light coupling efficiency adjustable means in the reproduction mode, and it is arbitrary in the recording mode within the range of (A) in FIG. 6, it is desirable to lower, at all times, passed light percentage at the light coupling efficiency adjustable means when labor of switching operation is considered.

Since it is necessary to raise passed light percentage at the light coupling efficiency adjustable means in the reproduction mode, and it is necessary to lower passed light percentage at the light coupling efficiency adjustable means in the recording mode within the range of (B) in FIG. 6, it is necessary to switch attenuate state by switching between recording mode and reproduction mode.

Since it is arbitrary in the reproduction mode and it is arbitrary also in the recording mode within the range of (C1) in FIG. 6, it is sufficient to raise, at all times, passed light percentage at the light coupling efficiency adjustable means.

Since it is arbitrary in the reproduction mode, and it is necessary to raise passed light percentage at the light coupling efficiency adjustable means in the recording mode within the range of (C2) in FIG. 6, it is desirable to raise, at all times, passed light percentage at the light coupling efficiency adjustable means when labor of switching operation is considered.

Accordingly, within the range of (C1) and (C2) in FIG. 6, it is sufficient to both raise, at all times, passed light percentage at the light coupling efficiency adjustable means.

In the case where hole is provided at cartridge which accommodates the optical recording medium to make discrimination, if two discrimination holes are provided so that these four discrimination areas can be discriminated, it is possible to perform processing as described above.

Without being limited to this value, it is sufficient to suitably set value of light coupling efficiency within the range where the dynamic range of the light source is satisfied. As occasion demands, plural light coupling efficiencies of 3 or more may be employed. In this case, manufacturing of the light source can be facilitated. In addition, it is possible to realize optical head and optical recording medium drive apparatus which can easily obtain satisfactory characteristic even if special light source is used.

As order of control in the case corresponding to multi-layer, e.g., two layers optical disc having plural layers of recording surfaces, first, at the time of loading of optical disc 102, disc type data (catalog data) recorded on the optical disc is initially reproduced by reproduction power corresponding to, e.g., single layer optical disc having optimum recording power smaller than multi-layer optical disc to make setting to recording and/or reproduction powers and light coupling efficiency corresponding to two layers optical disc in the case of two layers optical disc.

Then, switching operation between recording mode and reproduction mode in the optical recording medium drive apparatus 101 as described above will be explained.

FIGS. 10A to 10D are timing charts showing the state of laser beams followed by switching operation between recording mode and reproduction mode in the optical recording medium drive apparatus 101, wherein FIG. 10A shows light quantity converged on the recording surface of the optical disc 102 (disc surface power), FIG. 10B shows transmission factor of laser beams in the light coupling efficiency adjustable element, FIG. 10C shows output of light detection element 216 for light branch quantity monitor, and FIG. 10D shows change of laser emission power.

In this optical recording medium drive apparatus 101, while taking timing in accordance with command from system controller 107 after response start of the liquid crystal element 214, the laser control unit 121 performs switching between the recording mode and the reproduction mode.

Namely, at the time of reproduction mode, a reasonable applied voltage is given by servo control unit 109 so that phase difference such that liquid crystal element 214 functions as half-wave plate is generated, and transmission factor of the light coupling efficiency adjustable element is set to 50%. Thus, laser emission power becomes equal to 5 mW so that satisfactory reproduction characteristic having less laser noise can be obtained.

Further, when switching is performed from the reproduction mode to the recording mode, applied voltage with respect to liquid crystal element 214 is first changed by servo control unit 109 in accordance with command from system controller 107 to change phase difference of the liquid crystal element 214.

Followed by response of the liquid crystal element 214, transmission factor of the light coupling efficiency adjustable element changes from 50% to 100%. Thus, laser emission power changes from 5 mW to 2.5 mW by the operation of auto-power control. At this time, output of the light detection element 216 for light branch quantity monitor is also lowered in accordance with change of transmission factor of the light coupling efficiency adjustable element and change of laser emission power. In addition, at this time, since the light crystal element has finite response speed, power converged onto the disc is maintained to be reproduction power at the transient time period of the response.

At the stage where output from the light branch quantity monitor is inputted to servo control unit 109 through preamplifier 120 so that it is below output reference value Poff set in advance, it is judged that transmission factor by the light coupling efficiency adjustable means becomes equal to value sufficiently close to 100%. As a result, signal recording pulses are generated from laser control unit 121 in accordance with command of signal modulation and ECC block 108 through system controller 107 so that laser emission power is modulated. Thus, recording of signal is performed.

Then, when switching is performed from the recording mode to the reproduction mode, the laser control unit 121 first performs switching between the recording and the reproduction mode in accordance with command from the system controller 107. In this state, since laser emission power takes small value of 2.5 mW, there results the state where laser noise is increased.

After the laser output is switched into reproduction power, applied voltage with respect to liquid crystal element 214 is changed by servo control unit 109 in accordance with command from system controller 107 to change phase difference of liquid crystal element 214.

In accordance with response of liquid crystal element 214, passing percentage of the light coupling efficiency adjustable element changes from 100% to 50%. By the operation of auto-power control, laser emission power changes from 2.5 mW to 5 mW. As a result, laser noise is decreased. Thus, satisfactory reproduction signal can be detected. At this time, at the stage where the light branch quantity monitor output is above reference value Pon set in advance, it is judged that the light coupling efficiency is sufficiently lowered to start reproduction of signal. In dependency upon situations, in switching into reproduction mode, there may be employed an approach to immediately start signal reproduction to make retry for a time period during which error takes place in reproduction signal by laser noise. In addition, at this time, output of light detection element 216 for light branch quantity monitor is also increased in accordance with change of transmission factor of the light coupling efficiency adjustable element and change of laser emission power.

On the assumption that the procedure in switching modes of recording/reproduction is not performed by the above procedure, inconvenience as described below would take place.

First, in the switching from the reproduction mode to the recording mode, since recording operation is started in the state where light output remains to be high, i.e., the light coupling efficiency remains to be small, laser may be broken in dependency upon circumstances in order to attempt to obtain output which exceeds the light output maximum rating of laser.

Moreover, in the switching from the recording mode to the reproduction mode, since the reproducing operation is started in the state where light output remains to be low, i.e., light coupling efficiency remains to be large, there are many laser noises so that satisfactory reproduction characteristic cannot be obtained. Further, when the light coupling efficiency is initially reduced after recording operation, there is the possibility that laser may be broken in dependency upon circumstances in order to attempt to obtain output which exceeds the light output maximum rating of laser.

By performing switching operation of recording/reproduction mode by using the above-described procedure, even if output ratio of laser at the time of recording and reproduction is small, laser noise at the time of reproduction can be sufficiently reduced. Thus, it becomes possible to provide optical recording medium drive apparatus in which satisfactory recording/reproduction characteristics can be obtained even by using light source having good manufacturing ability or light source of small light output maximum rating. Namely, in order that the above-described problem is not caused to take place, it is sufficient to keep timing and to start recording/reproduction after the time during which adjustable operation of the light coupling efficiency adjustable means is securely completed is passed, or to detect ON/OFF of the adjustable operation (increase/decrease of light coupling efficiency) by any technique to perform management thereof.

As a technique of detecting ON/OFF (increase/decrease of light coupling efficiency) of the adjustable operation, technique as described below is conceivable.

For example, in the case where adjustable operation is performed in mechanical manner, position sensor, etc. may be used to recognize drive state. Further, rear monitor terminal of the semiconductor laser (output from light receiving element which monitors light emitted in a direction opposite to the emission direction) may be used, or light receiving element may be provided to monitor light which does not arrive at the portion on the optical recording medium so that it is left to thereby detect change of light output.

In the case where the branch ratio of light is caused to be adjustable by polarized beam splitter film surface 215R, it is sufficient, as described above, to provide light receiving element to detect branched light power.

Then, the operation of this optical recording medium drive apparatus will be explained in more detail by the flowchart.

Let first consider that light coupling efficiency is changed at switching between recording mode and reproduction mode by using output of light detection element 216 for light branch quantity monitor. As the operation mode of the optical recording medium drive apparatus, three states of "recording mode", 2reproduction mode" and "standby mode" are conceivable. When "recording mode" is indicated by "W", "reproduction mode" is indicated by "R" and "standby mode" is indicated by "-", change of the operation mode as described below is conceivable.

[R-W-W-R-R-R-W-R-W-R-R]

Further, as execution of change of the light coupling efficiency, i.e., timing of "switching of attenuate state", three timings as described below are conceivable.

Figure 11:
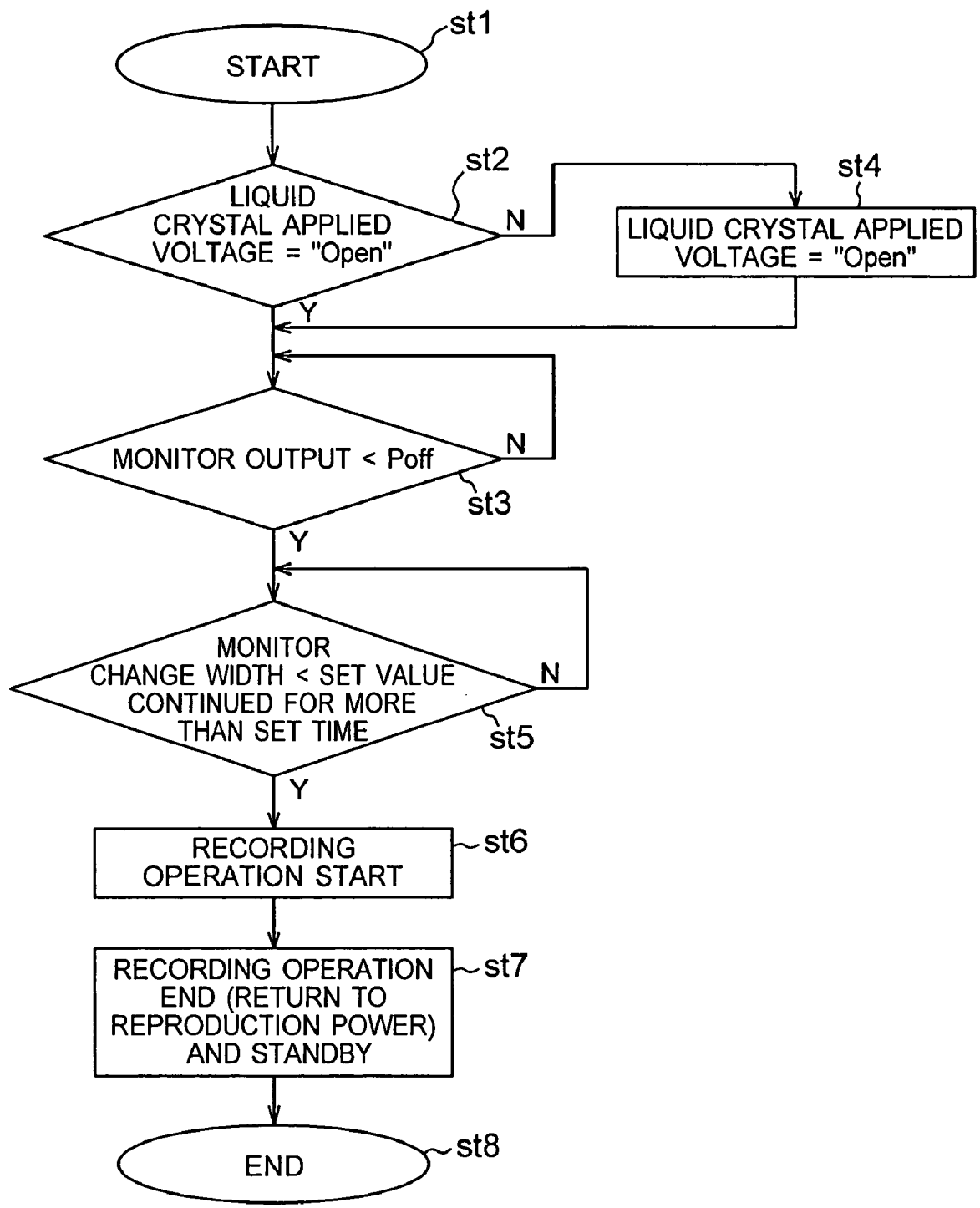
FIG. 11 is a flowchart showing the operation in which "attenuate state" is held in the "standby state", and "switching of the attenuate state" is performed after command of "recording" is received in the optical recording medium drive apparatus.
Figure 12:
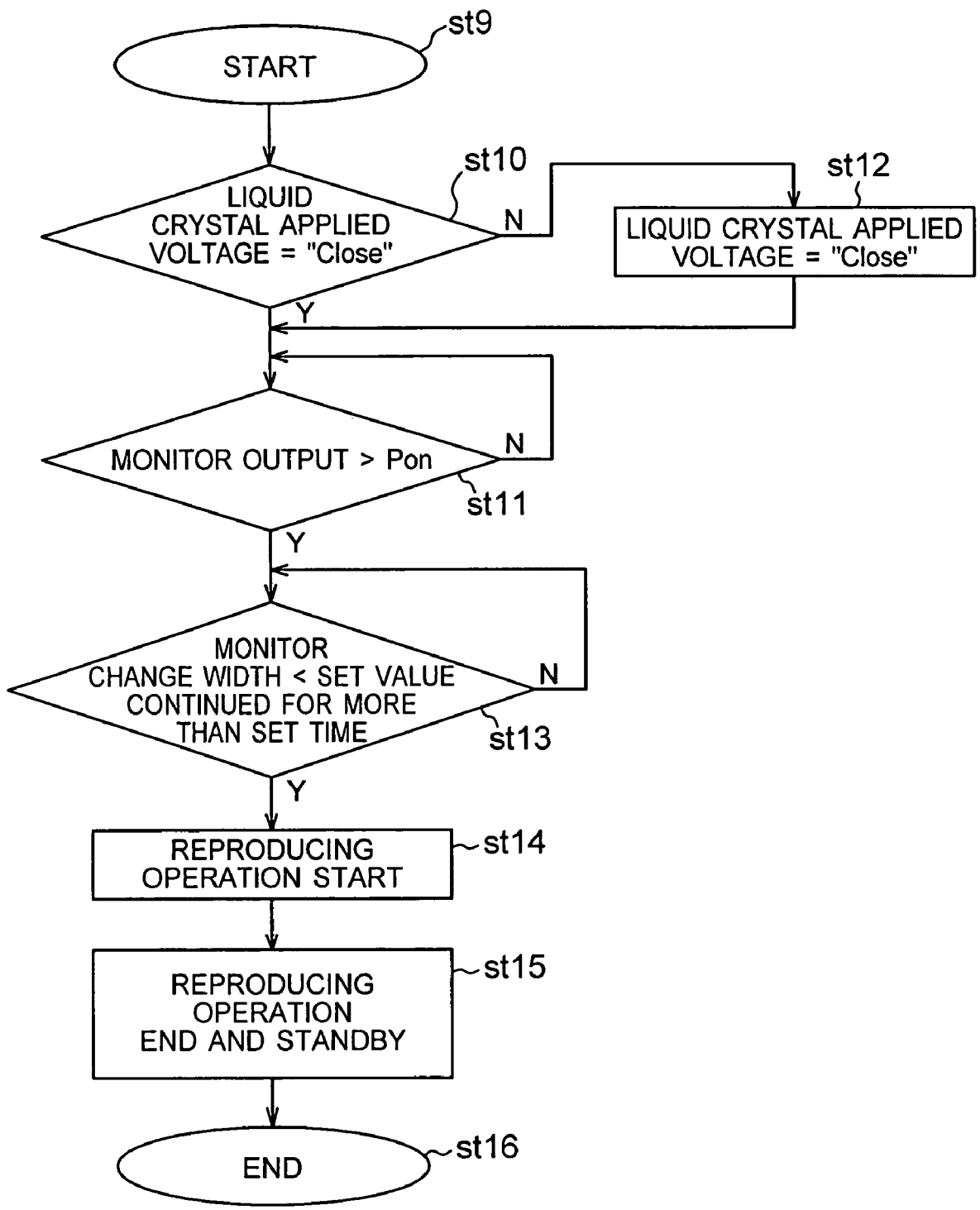
FIG. 12 is a flowchart showing the operation in which "attenuate state" until that time is held in the "standby state", and "switching of the attenuate state" is performed after command of "reproduction" is received in the optical recording medium drive apparatus.

(1) "Attenuate state" until now is held in the "standby" state to perform "switching of attenuate state" after command of "reproduction" or "recording" is received. The operation in this case is shown in FIGS. 11 and 12.

Figure 13:
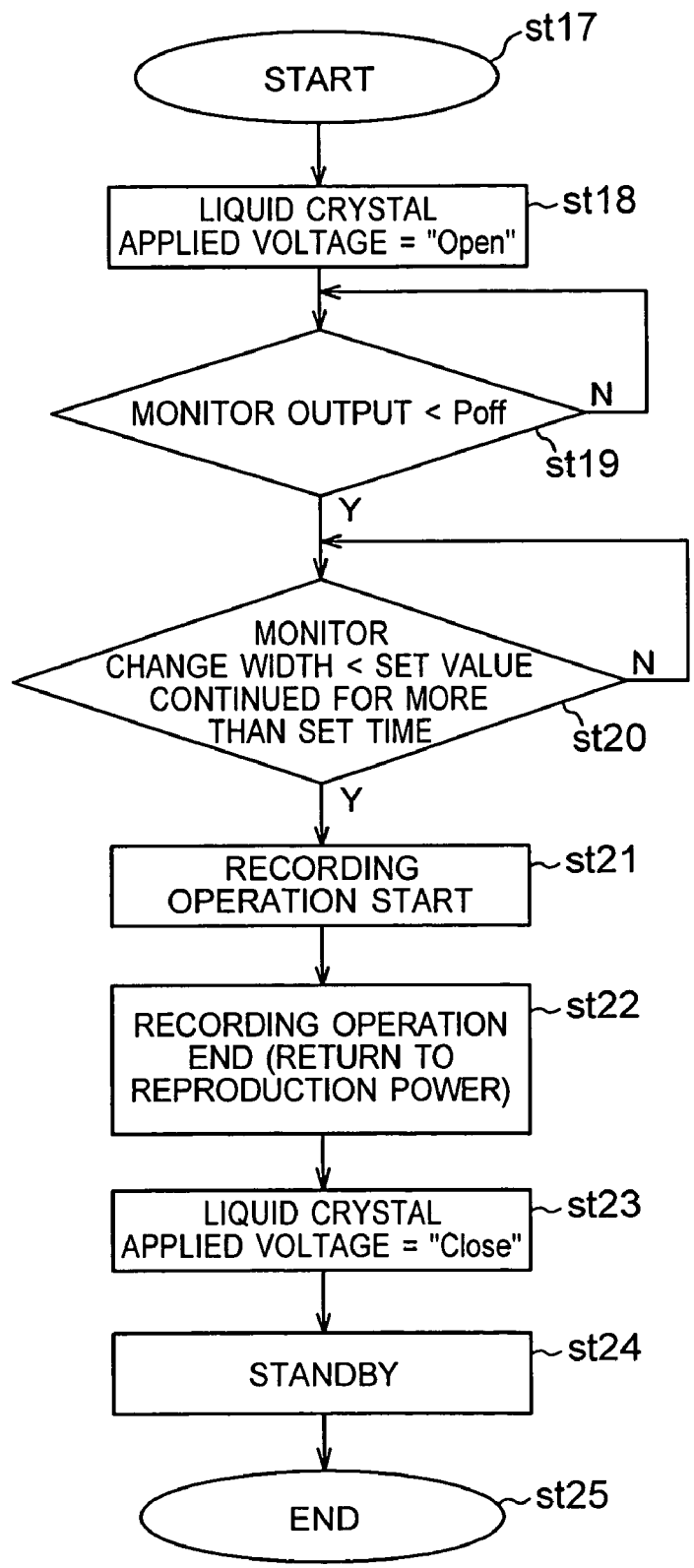
FIG. 13 is a flowchart showing the operation in which, when command of "recording" is received, "attenuate state" of low light coupling efficiency is held in the "standby state" at all times, and switching to "attenuate state" of high light coupling efficiency is performed only when "recording" command is received in the optical recording medium drive apparatus.
Figure 14:
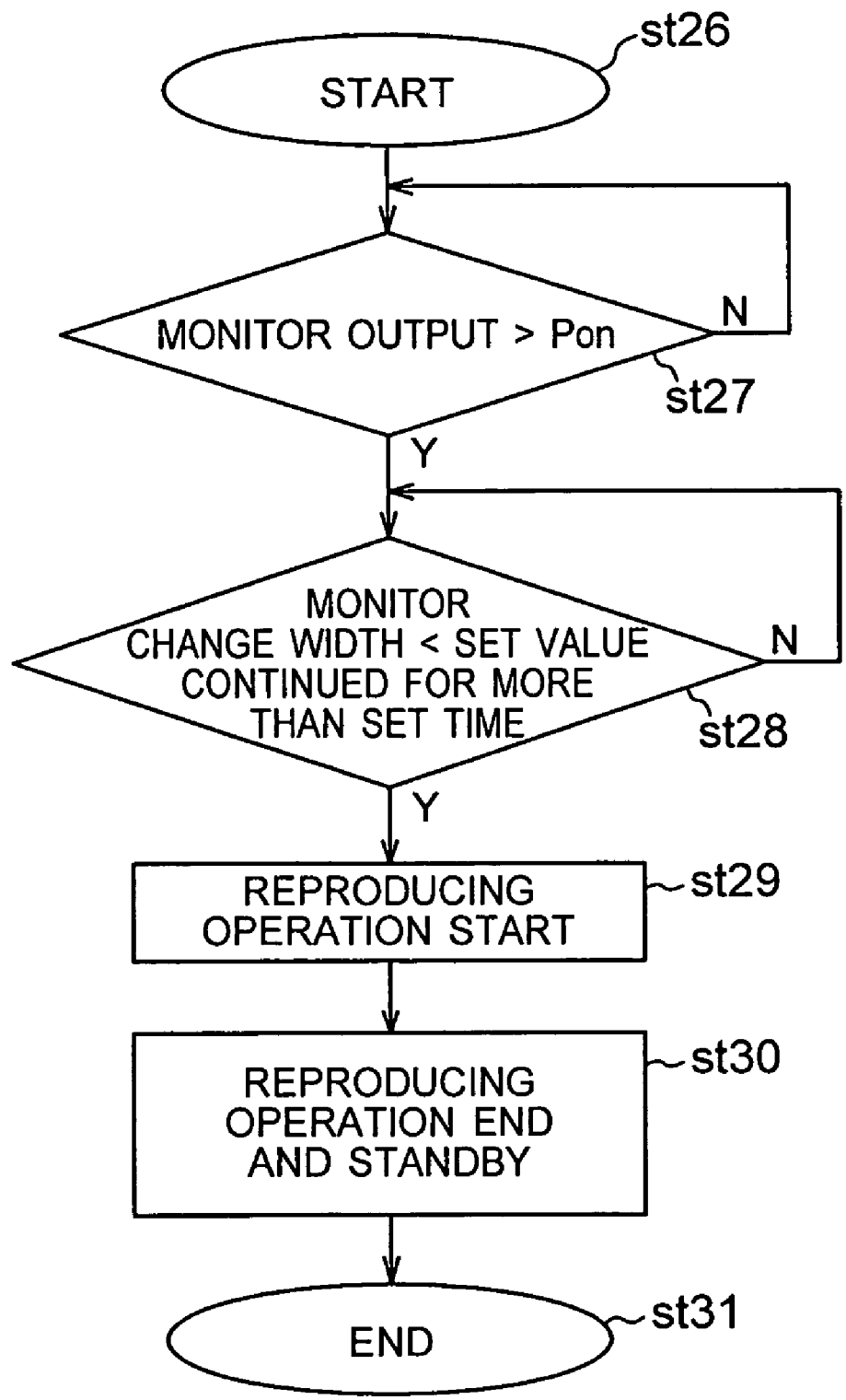
FIG. 14 is a flowchart showing the operation in which, when command of "reproduction" is received, "attenuate state" of low light coupling efficiency is held at all times in the "standby state" and switching to "attenuate state" of high light coupling efficiency is performed only when "recording" command is received in the optical recording medium drive apparatus.

(2) There results "attenuate state" having low light coupling efficiency at all times in the "standby" state, and switching to "attenuate state" having high light coupling efficiency is performed only when "recording" command is received. The operation in this case is shown in FIGS. 13 and 14.

Figure 15:
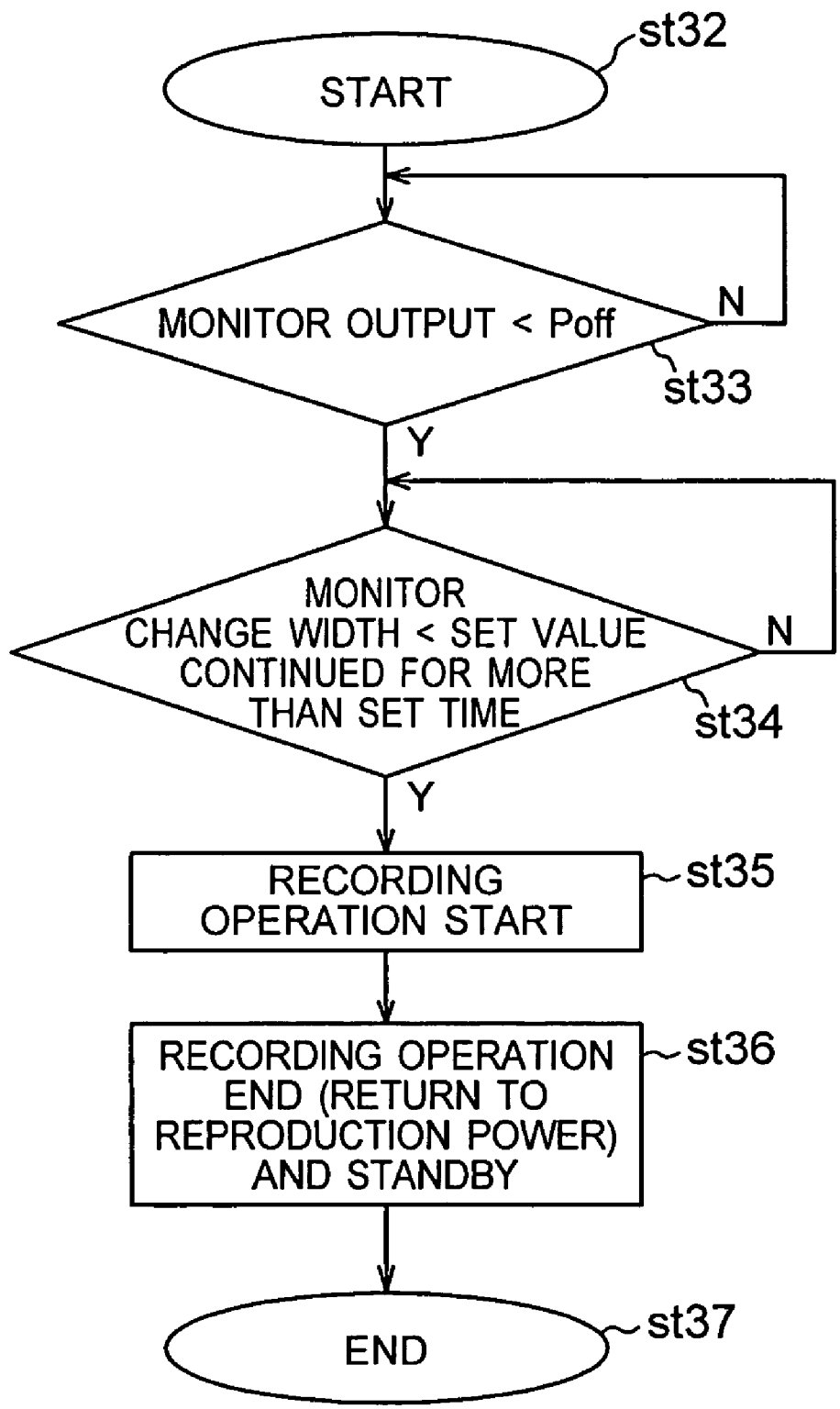
FIG. 15 is a flowchart showing the operation in which, when command of "recording" is received, "attenuate state" of high light coupling efficiency is held at all times in the "standby state", and switching operation to "attenuate state" of high light coupling efficiency is performed only when "reproduction" command is received in the optical recording medium drive apparatus.
Figure 16:
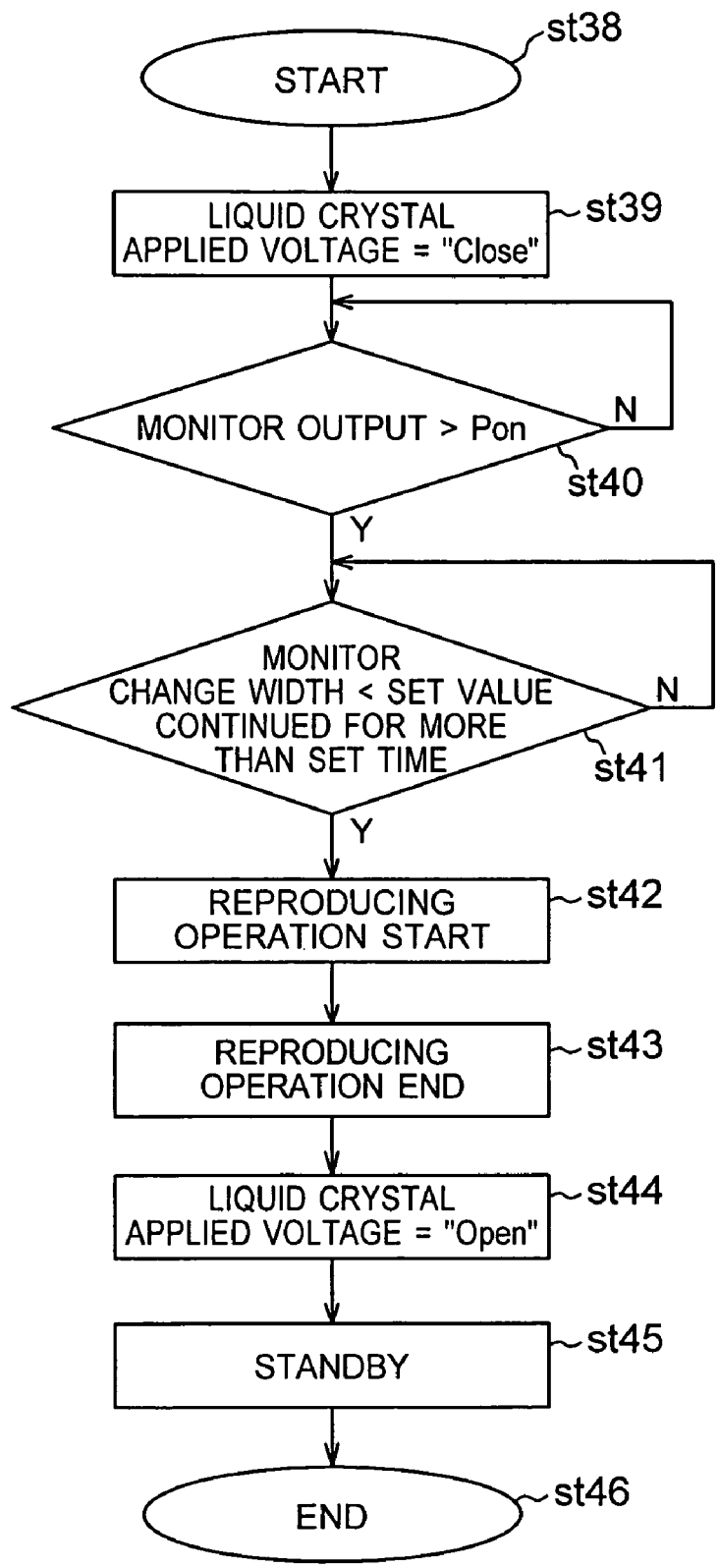
FIG. 16 is a flowchart showing the operation in which, when command of "reproduction" is received, "attenuate state" of high light coupling efficiency is held at all times in the "standby state", and switching to "attenuate state" of high light coupling efficiency is performed only when "reproduction" command is received in the optical medium drive apparatus.

(3) There results "attenuate state" having high light coupling efficiency at all times in the "standby" state, and switching to "attenuate state" having low light coupling efficiency is performed only when "reproduction" command is received. The operation in this case is shown in FIGS. 15 and 16.

Explanation will be given below in connection with these three timings.

(1) The case where "attenuate state" until now is held in the "standby" state, and "switching of attenuate state" is performed after next command of "reproduction" or "recording" is received (see FIGS. 11 and 12).

First, in the case where system controller 107 holds "attenuate state" until now in the "standby" state to perform "switching of attenuate state" after next command of "reproduction" or "recording" is received, in the case where command of "recording" is received, processing starts at step st1 as shown in FIG. 11 to control liquid crystal applied voltage at the subsequent step st2 to discriminates whether or not the liquid crystal applied voltage is voltage which elevates the light coupling efficiency (voltage corresponding to "Open". As a result, if the liquid crystal voltage is voltage which elevates the light coupling efficiency, processing proceeds to step st3. If the liquid crystal applied voltage is voltage which lowers the light coupling efficiency, processing proceeds to step st4. At the step st4, the system controller 107 controls the liquid crystal applied voltage to allow the liquid crystal applied voltage to be voltage which elevates the light coupling efficiency (voltage corresponding to "Open"). Thus, processing proceeds step st3. At the step st3, the system controller 107 discriminates whether or not output of the light detection element 216 for light branch quantity monitor is lower than a predetermined set value (reference value Poff). If that output is lower than the predetermined set value (reference value Poff), processing proceeds to step st5. When that output is not lower than the predetermined set value (reference value Poff), processing remains at the step st3. At step st5, the system controller 107 discriminates whether or not the time period during which width of change of output of the light detection element 216 for light branch quantity monitor is smaller than a predetermined set width is continued for more than predetermined time. If the time period during which that width is smaller than the predetermined set width is continued for more than predetermined set time, processing proceeds to step st6. If the time period during which that width is smaller than the predetermined set width is not continued for more than predetermined set time, processing remains at the step st5. At the step st6, the system controller 107 starts recording operation. Further, when there results the timing at which the recording operation should be completed, processing proceeds to the subsequent step st7 to complete recording operation to return to reproduction power to shift to "standby" mode to complete the operation at step st8.

Then, in the case where the system controller 107 holds "attenuate state" until now in the "standby" state to perform "switching of attenuate state" after next command of "reproduction" or "recording" is received, in the case where command of "reproduction" is received, processing starts at step st9 as shown in FIG. 12 to control liquid crystal applied voltage at the subsequent step st10 to discriminate whether or not the liquid crystal applied voltage is voltage which lowers light coupling efficiency (voltage corresponding to "Close"). As a result, if the liquid crystal applied voltage is not voltage which lower the light coupling efficiency, processing proceeds to step st11. If the liquid crystal applied voltage is voltage which elevates the light coupling efficiency, processing proceeds to step st12. At the step st12, the system controller 107 controls liquid crystal applied voltage to allow liquid crystal applied voltage to be voltage which lowers light coupling efficiency (voltage corresponding to "Close") to proceed to step st11. At the step st11, the system controller 107 discriminates whether or not output of light detection element 216 for light branch quantity monitor is higher than a predetermined set value (reference value Pon). If that output is higher than the predetermined set value (reference value Pon), processing by the system controller 107 proceeds remains to step st13. When that output is not higher than the predetermined set value (reference value Pon), processing at the step st11. At step st13, the system controller 107 discriminates whether or not the time period during which width of change of output of the light detection element 216 for light branch quantity monitor is smaller than a predetermined set value is continued for more than predetermined set time. If the time period during which that width is smaller than the predetermined set width is continued for more than the predetermined set time, processing by the system controller 107 proceeds to step st14. If the time period during which that width is smaller than the predetermined set width is not continued for more than predetermined set time, processing remains at the step st13. At step st14, the system controller 107 starts reproducing operation. Further, if there results the timing at which reproducing operation should be completed, processing by the system controller 107 proceeds to the subsequent step st15 to complete reproducing operation to shift to "standby" mode to complete the operation at step st16.

(2) The case where "attenuate state" having low light coupling efficiency is held at all times in the "standby" state, and switching to "attenuate state" having high light coupling efficiency is performed only when "recording" command is received (set FIGS. 13 and 14).

Further, in the case where command of "recording" is received in the operation in which "attenuate state" having low light coupling efficiency is held at all times in the "standby" state, and switching to "attenuate state" having high coupling efficiency is performed only when "recording" command is received, processing starts at step st17 as shown in FIG. 13, and the system controller 107 controls liquid crystal applied voltage at the subsequent step st18 to allow liquid crystal applied voltage to be voltage which elevates light coupling efficiency (voltage corresponding to "Open"). Thus, processing proceeds to step st19. At the step st19, whether or not output of the light detection element 216 for light branch quantity monitor is lower than a predetermined set value (reference value Poff) is discriminated. If that output is lower than the predetermined set value (reference value Poff), processing by the system controller 107 proceeds to step st20. If that output is not lower than the predetermined set value (reference value Poff), processing remains at the step st19. At step st20, the system controller 107 discriminates whether or not the time period during which width of change of output of the light detection element for light branch quantity monitor is smaller than a predetermined set width is continued for more than predetermined set time. If the time period during which that width is smaller than the predetermined set width is continued for more than the predetermined set value, processing by the system controller 107 proceeds to step st21. If the time period during which that width is smaller than the predetermined set width is not continued for more than the predetermined set time, processing by the system controller 107 remains at the step st20. At step st21, the system controller 107 starts recording operation. Further, if there results the timing at which the recording operation should be completed, processing by the system controller 107 proceeds to the subsequent step st22 to complete recording operation to return to reproduction power to proceed to step st23. At the step st23, the system controller 107 controls liquid crystal applied voltage to allow the liquid crystal applied voltage to be voltage which lowers light coupling efficiency (voltage corresponding to "Close"). Thus, processing proceeds to step st24. At the step st24, processing by the system controller 107 shifts to "standby" mode. Thus, the system controller 107 completes the operation at step st25.

Further, in the case where command of "reproduction" is received in the operation in which "attenuate state" having low light coupling efficiency is held at all times in the "standby" state, and switching to "attenuate state" having high light coupling efficiency is performed only when "recording" command is received, processing starts at step st26 as shown in FIG. 14, and the system controller 107 discriminates at the subsequent step st27 whether or not output of the light detection element 216 for light branch quantity monitor is higher than a predetermined set value (reference value Pon) If that output is higher than a predetermined set value (reference value Pon), processing by the system controller 107 proceeds to step st28. If that output is not higher than the predetermined set value (reference value Pon), processing remains at the step st27. At step st28, the system controller 107 discriminates whether or not the time period during which width of change of output of the light detection element for light branch quantity monitor is smaller than a predetermined set width is continued for more than predetermined time. If the time period during which that width is smaller than the predetermined set width is continued for more than predetermined set time, processing by the system controller 107 proceeds to step st29. If the time period during which that time is smaller than the predetermined set value is not continued for more than the predetermined set time, processing remains at the step st28. At step st29, the system controller 107 starts reproducing operation. Further, if there results the timing at which reproducing operation should be completed, processing by the system controller 107 proceeds to the subsequent step st30 to complete reproducing operation to shift to "standby" mode to complete the operation at step st31.

(3) The case where "attenuate state" having high light coupling efficiency is held at all times in the "standby" state, and switching to "attenuate state" having low light coupling efficiency is performed only when "reproduction" command is received (see FIGS. 15 and 16).

Further, in the case where command of "recording" is received in the operation in which "attenuate state" having high light coupling efficiency is held at all times in "standby" state, and "attenuate state" having low light coupling efficiency is performed only when "reproduction" command is performed, processing starts at step st32 as shown in FIG. 15, and the system controller 107 discriminates at the subsequent step st33 whether or not output of light detection element 216 for light branch quantity monitor is lower than a predetermined set value (reference value Poff). If that output is lower than the predetermined set value (reference value Poff), processing by the system controller 107 proceeds to step st34. If that output is not lower than the predetermined set value (reference value Poff), processing remains at the step st33. At step st34, the system controller 107 discriminates whether or not the time period during which width of change of output of the light detection element for light branch quantity monitor is smaller than the predetermined set value is continued for more than predetermined time. If the time period during which that width is smaller than the predetermined set width is continued for more than predetermined set time, processing by the system controller 107 proceeds to step st35. If the time period during which that width is smaller than the predetermined set width is not continued for more than predetermined time, processing remains at step st34. At step st35, the system controller 107 starts the recording operation. Further, when there results the timing at which the recording operation should be completed, processing by the system controller 107 proceeds to the subsequent step st36 to complete recording operation to return to reproduction power to shift to "standby" mode to complete the operation at step st37.

Then, in the case where command of "reproduction" is received in the operation in which "attenuate state" having high light coupling efficiency is held at all times in the "standby" state, and switching to "attenuate state" having low light coupling efficiency is performed only when "reproduction" command is received, processing by the system controller 107 starts at step st38 as show in FIG. 16, and the system controller 107 controls liquid crystal applied voltage to allow the liquid crystal applied voltage to be voltage which lowers light coupling efficiency (voltage corresponding to "Close"). Thus, the processing proceeds to step st40. At the step st40, the system controller 107 discriminates whether or not output of the light detection element 216 for light branch quantity monitor is higher than a predetermined set value (reference value Pon). If that output is higher than the predetermined set value (reference value Pon), processing by the system controller 107 proceeds to step st41. If that output is not higher than the predetermined set value (reference value Pon), the processing remains at the step st40. At step st41, the system controller 107 discriminates whether or not the time period during which width of change of output of the light detection element 216 for light branch quantity monitor is smaller than a predetermined set width is continued for more than predetermined set time. If the time period during which that width is smaller than the predetermined set width is continued for more than predetermined set time, processing by the system controller 107 proceeds to step st42. If the time period during which that width is smaller than the predetermined set width is not continued for more than predetermined set time, the processing remains at the step st41. At step st42, the system controller starts reproducing operation. Further, if there results the timing at which the reproducing operation should be completed, processing by the system controller 107 proceeds to the subsequent step st43 to complete recording operation to proceed to step st44. At the step st44, the system controller 107 controls liquid crystal applied voltage to allow the liquid crystal applied voltage to be voltage which increases light coupling efficiency (voltage corresponding to "Open"). Thus, the processing by the system controller 107 proceeds to step st45. At step st45, the processing shifts to "standby" mode to complete the operation at step st46.

Figure 17:
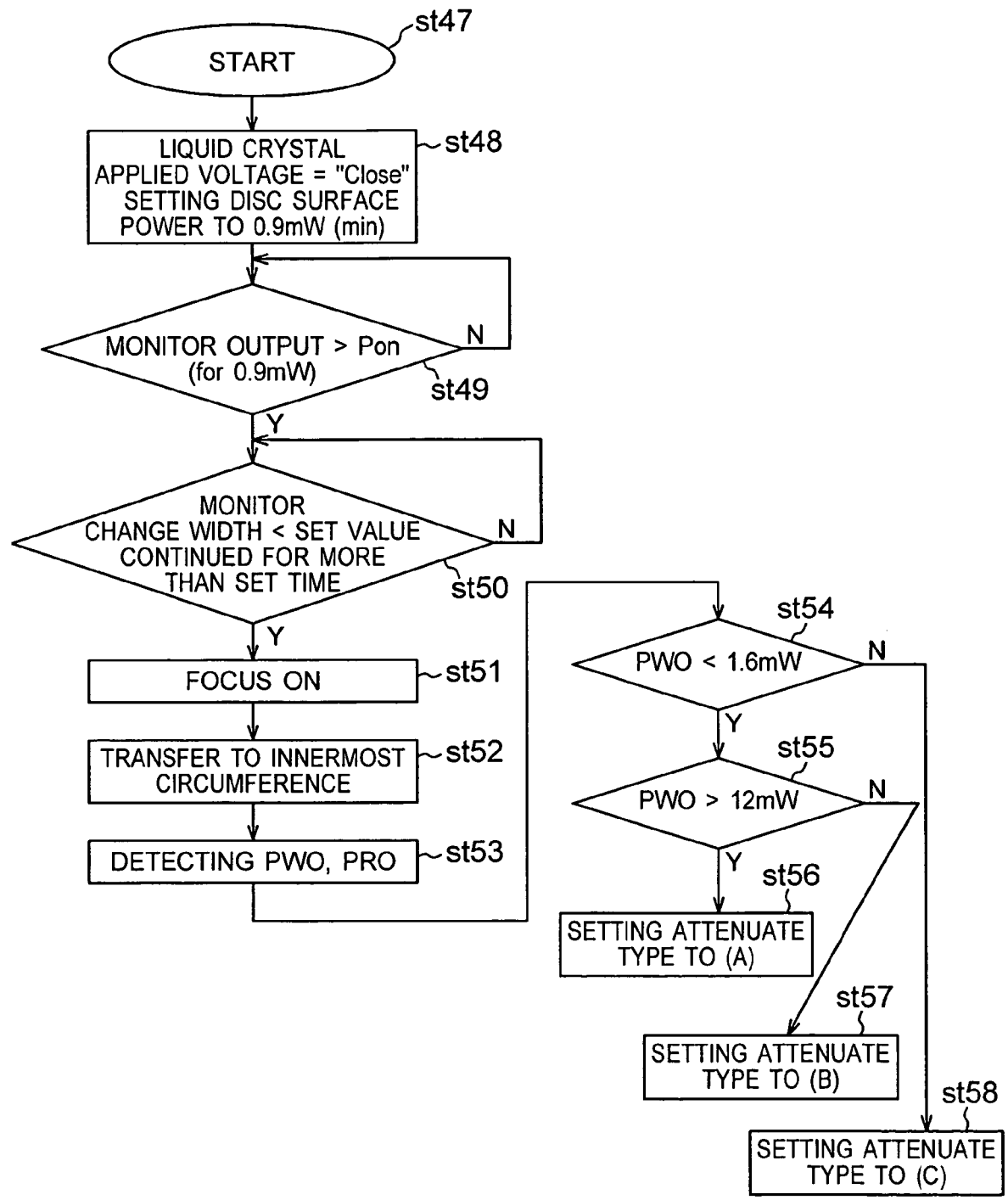
FIG. 17 is a flowchart showing switching operation of "attenuate state" in the case where the optical recording medium drive apparatus copes with plural types of recording media therein.

Moreover, as countermeasure for different types of optical recording media, as shown in FIG. 17, processing by the system controller 107 proceeds at step st47. The system controller 107 controls liquid crystal applied voltage at the subsequent step st48 to allow the liquid crystal applied voltage to be voltage which lowers light coupling efficiency (voltage corresponding to "Close") to set output of irradiation light beams on the recording surface of the optical disc (disc surface power) to a predetermined value, e.g., 0.9 mW (min). The processing proceeds to step st49. At the step st49, the system controller 107 discriminates at the step st49 whether or not output of the light detection element 216 for light branch quantity monitor is higher than a predetermined set value (reference value Pon (value corresponding to 0.9 mW). It is to be noted that since output of the light detection element 216 for light branch quantity monitor is changed in accordance with setting of the disc surface power, value of the set value (reference value Pon) is suitably set in accordance with such change. If output of the light detection element 216 for light branch quantity monitor is higher than the predetermined set value (reference value Pon), processing by the system controller 107 proceeds to step st50. If that output is not higher than the predetermined set value (reference value Pon), the processing remains at the step st49. At the step st50, the system controller 107 discriminates whether or not the time period during which width of change of output of the light detection element 216 for light branch quantity monitor is smaller than a predetermined set width is continued for more than the predetermined set time. If the time period during which that width is smaller than the predetermined set width is continued for more than the predetermined set time, processing by the system controller 107 proceeds to step st51. If the time period during which that width is smaller than the predetermined set width is not continued for more than the predetermined set time, the processing remains at the step st50. At step st51, the system controller 107 starts focus servo operation in the optical head (focus ON). The processing by the system controller 107 proceeds to step st52. At the step st52, the system controller 107 transfers (moves) the optical head to the innermost circumferential position of the optical disc. The processing by the system controller 107 proceeds to step st53. At the step st53, the system controller 107 detects recommended recording power PW0 and recommended reproduction power PR0. Thus, the processing proceeds to step st54.

At the step st54, the system controller 107 discriminates whether or not recommended reproduction power PR0 is smaller than a predetermined value, e.g., 1.6 mW. If the recommended reproduction power PR0 is smaller than the predetermined value, processing by the system controller 107 proceeds to step st55. If the recommended reproduction power PR0 is not smaller than the predetermined value, the processing by the system controller 107 proceeds to step st58. At the step st55, the system controller 107 discriminates whether or not the recommended recording power PW0 is larger than a predetermined value, e.g., 12 mW. If the recommended recording power PW0 is larger than the predetermined value, the processing proceeds to step st56. If the recommended recording power PW0 is not larger than the predetermined value, the processing proceeds to step st57.

At the step st56, the system controller 107 discriminates "attenuate type" as type shown in FIG. 6A to control liquid crystal applied voltage in accordance with this discrimination result. At the step st57, the system controller 107 discriminates "attenuate type" as type shown in FIG. 6B to control liquid crystal applied voltage in accordance with this discrimination result. At step st58, the system controller 107 discriminates "attenuate type" as type shown in FIG. 6C ((C1) or (C2)) to control the liquid crystal applied voltage in accordance with this discrimination result.

In all configurations of the above-described optical head, there may be employed configuration such that S-polarized light which has been passed through phase plate 217 is incident on beam splitter 218. In this case, this optical head is constituted as the state where the positional relationship between quarter wave-plate 224, object lens 220, optical disc 102 and detection element 219 for FAPC is switched.

Namely, in this optical head 104, incident light beams which have been passed through the phase plate 217 are caused to be substantially S-polarized light with respect to the reflection surface that the beam splitter 218 has. The phase plate 217 is rotationally adjusted around the optical axis so as to allow polarization direction of incident light beams to be S-polarized light with respect to the reflection surface of the beam splitter 218. At this beam splitter 218, a predetermined percentage (e.g., a predetermined percentage less than 95%) of incident light beams is reflected by the reflection surface, and is incident on quarter wavelength plate 224. Here, a portion (of, e.g., a predetermined percentage of 5% or more) of the incident light beams which have been transmitted through the reflection surface is incident on detection element 219 for FAPC. The incident light beams which have been reflected at the beam splitter 218 are transmitted through the quarter wavelength plate 224 so that they are changed into circular polarized light. The incident light beams obtained as the circular polarized light are converged onto the recording surface of the optical disc 102 by the object lens 220.

Further, reflected light beams reflected on the recording surface of the optical disc 102 are transmitted through quarter wavelength plate 224 via object lens 220 so that they are changed into linearly polarized light in a direction perpendicular to polarization direction of light beams of outgoing optical path. The light beams obtained as linearly polarized light return to beam splitter 218. At this time, reflected light beams are caused to be substantially P-polarized light with respect to the reflection surface of the beam splitter 218. Substantially total quantity thereof is transmitted through the reflection surface, and is separated with respect to the optical path from the semiconductor laser element 212. The reflected light beams which have been separated with respect to the optical path from semiconductor laser element 212 are converged into convergent light at detection lens 221. Astigmatism for obtaining focus error signal by the astigmatism method is rendered thereto by means of multi-lens 222. The convergent light thus obtained is incident on light detection element 223.

Also in this case, in this optical head 104, since S-polarized light with respect to the reflection surface is separated at a predetermined percentage (ratio) at the beam splitter 218, also in the case where P-polarized light component with respect to the reflection surface is included somewhat in reflected light beams onto the beam splitter 218, it is possible to precisely monitor light quantity of light beams outgoing toward the recording surface of the optical disc 102. Accordingly, when the light coupling efficiency is adjustably controlled by control of the liquid crystal element 214, there is no possibility that output of irradiation light beams onto the recording surface of the optical disc 102 may be greatly changed from scheduled output.

It is to be noted that, in the above-described optical heads of all configurations, the light coupling efficiency adjustable means is not limited to the above-described means, but light coupling efficiency adjustable means of other systems may be used.

Explanation will be given below in connection with practical system for realizing light coupling efficiency adjustable element.

As a system for realizing the light coupling efficiency adjustable element, it is conceivable to use "optical path branch means which branches light beams into those of at least two optical paths". Namely, branch ratio of two optical paths is changed by the optical path branch means to thereby light coupling efficiency.

Figures 18A, 18B:
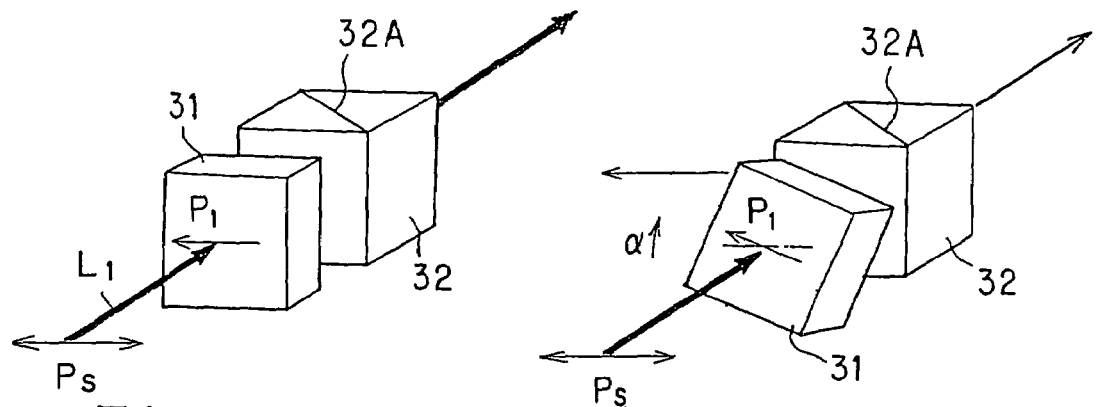
FIGS. 18A to 18c are perspective views and a graph showing a first practical example of the system for realizing light coupling efficiency element of optical head.

As shown in FIGS. 18A and 18B, phase plate (polarization state adjusting means) 31 and polarization beam splitter 32 are provided as optical path branch means which branches light beams to perform rotational displacement of wave-length plate 31 about the optical axis, thereby making it possible to change ratio in which light beams are branched at polarization beam splitter film of the polarization beam splitter 32.

In the case where optical axis direction $P_1$ of wave-length plate 31 is caused to be in correspondence with polarization direction $P_s$ of incident light $L_1$ as shown in FIG. 18A, substantially all rays of incident light $L_1$ are transmitted toward the optical disc without being reflected by the polarization beam splitter 32.

On the other hand, optical axis direction $P_1$ of the wave-length plate 31 is rotated by a predetermined angle $\alpha$ from polarization direction $P_s$ of incident light $L_1$ to thereby permit a portion of incident light $L_1$ to be reflected at the polarization beam splitter 32, and to permit only the remaining incident light to be transmitted in a direction of the optical disc.

For example, in the case where the polarized beam splitter film is PS perfect separation film (Tp (P-polarized light transmission factor)=100%, Rs(S-polarized light transmission factor)=100%), and the wave-length plate is half-wave plate, the relationship between rotation angle $\alpha$ and passed light percentage T is as follows.

Figure 18C:
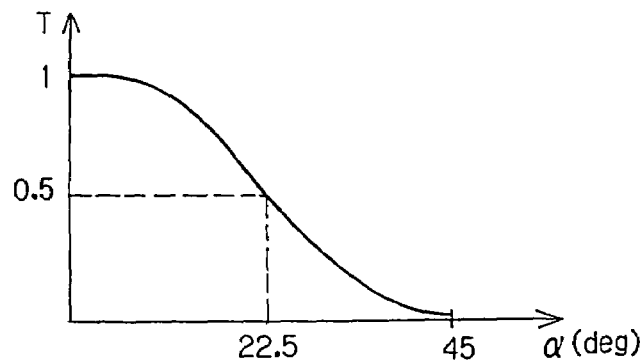

First, when the rotation angle is a, the polarization direction is rotated by $2\alpha$. At this time, percentage (ratio) of P-polarized light incident on the beam splitter (i.e., passed light percentage (ratio) T) has the relationship represented by FIG. 18 as described below.

$$T=\cos 2 2\alpha=(1+\cos 4\alpha)/2$$

Accordingly, if there is need that, e.g., the light coupling efficiency is used within the range from 100% to 50%, it is sufficient to perform switching within the range from $\alpha$=0 degrees to 22.5 degrees. Thus, polarization direction is changed by 45 degrees to have ability to control the passed light ratio so that it is 100% or 50%.

Figures 19A, 19B:
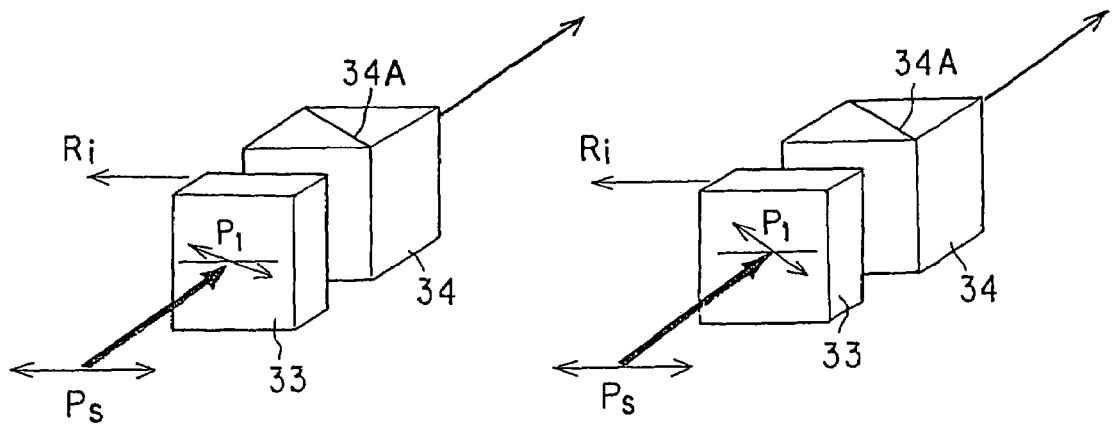
FIGS. 19A and 19B are perspective views showing a second practical example of the system for realizing light coupling efficiency adjustable element of optical head.

FIGS. 19A and 19B are explanatory views showing the previously described practical example, wherein liquid crystal element 33 and polarization beam splitter 34 are provided as optical path branch means for branching light beams $L_1$ to operate the liquid crystal element 33 as wave-length plate to thereby branch light beams $L_1$ by polarized beam splitter surface 34A.

Namely, as shown in FIG. 19A, liquid crystal element 33 in which the rubbing direction $R_1$ is set to 22.5 degrees is used so that N is integer and is wavelength with respect to the phase difference, and N$\lambda$ to (N+0.5)$\lambda$ or N$\lambda$ to (N−0.5)$\lambda$ is changed, whereby polarized light direction of light incident on the polarization beam splitter 34 is changed by 45 degrees. Thus, it is possible to change to passed light percentage (ratio) within the range from 100% to 50%.

Moreover, as shown in FIG. 19B, liquid crystal element 33 in which the rubbing direction $R_1$ is set to 45 degrees so that N is integer and $\lambda$ is wavelength with respect to the phase difference, and N$\lambda$ to (N+0.25)$\lambda$ or N$\lambda$ to (N−0.25)$\lambda$ is changed, whereby light beams incident on the beam splitter 34 can be changed from P-polarized light to circuit polarized light. Thus, it is possible to change the passed light percentage (ratio) within the range from 100% to 50%.

Figure 20A:
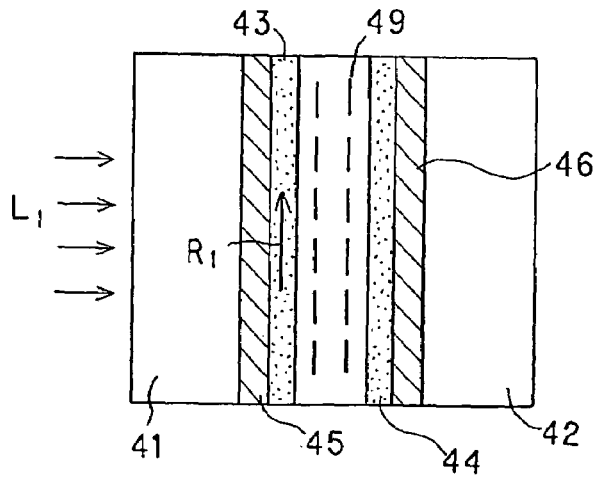
FIGS. 20A to 20D are cross sectional views and graphs showing the structure and its operation of liquid crystal element which is light coupling efficiency adjustable element shown in FIGS. 19A and 19B.
Figure 20B:
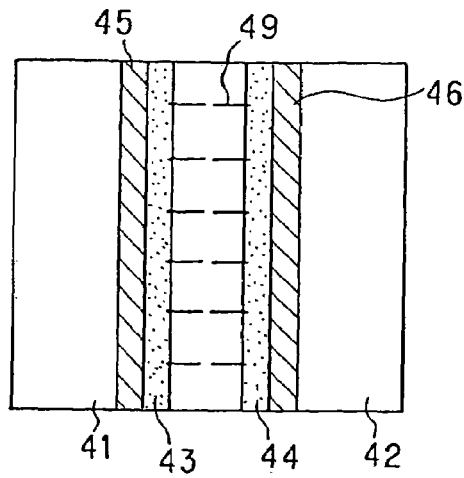

FIGS. 20A to 20B are cross sectional views showing the cross sectional structure of the liquid crystal element, FID 20C is a graph showing change of refractive index of the liquid crystal element with respect to applied voltage, and FID 20D is a graph showing change of phase difference with respect to applied voltage.

Here, as shown in FIGS. 20A and 20B, the liquid crystal element 40 is caused to be of the configuration in which liquid crystal molecules 49 are sealed between two glass bases (substrates) 41, 42, wherein the liquid crystal molecules 49 are oriented by orientation films 43, 44 provided at the inner surface of respective glass bases (substrates) 41, 42.

Between the respective glass bases 41, 42 and the orientation films 43, 44, there are provided transparent electrode films 45, 46. Further, applied voltage between these transparent electrode films 45, 46 is changed, whereby the liquid crystal molecules 49 change from the state where they are disposed inn parallel to the orientation films 43, 44 and are disposed along the rubbing direction (indicated by arrow A in the figure) as shown in FIG. 20A to the state where they are raised perpendicular to the orientation films 43, 44 as shown in FIG. 20B.

Figure 20C:
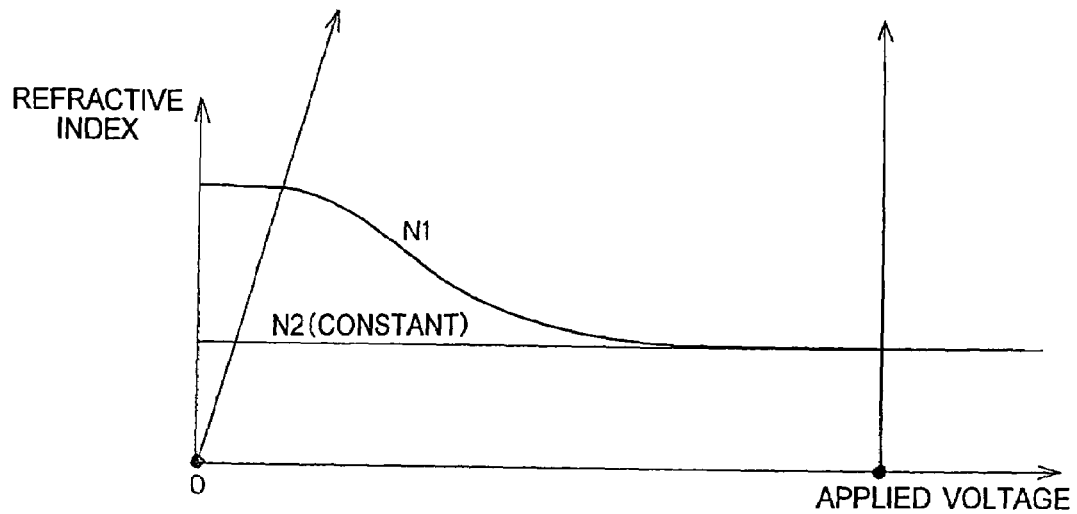

Here, when refractive index in the direction along the rubbing direction when the liquid crystal molecules 49 are in parallel to the orientation films 43, 44 is assumed to be N1, and refractive index in the direction along the rubbing direction when the liquid crystal molecules 49 are perpendicular to the rubbing direction is assumed to be N2, refractive index N1 in the direction along the rubbing direction is changed as shown in FIG. 20C in accordance with displacement of the liquid crystal molecules 49 by change of applied voltage. It is to be noted that refractive index N2 in the direction perpendicular to the rubbing direct is constant.

Figure 20D:
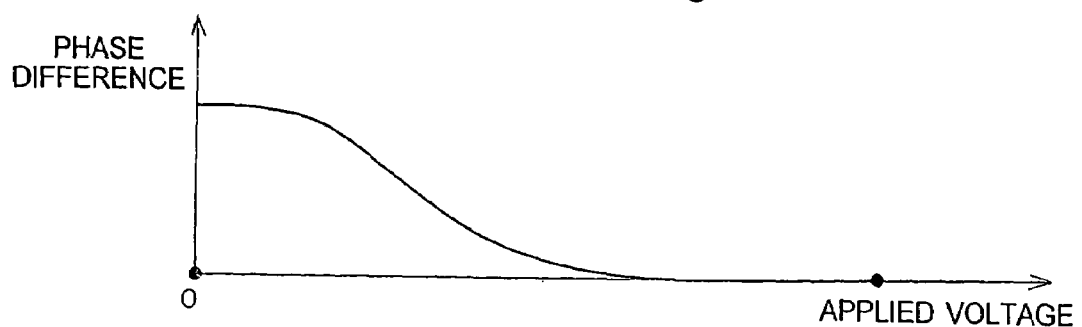

As a result, phase difference taking place in incident polarized light in the direction along the rubbing direction is changed as shown in FIG. 20D.

Such principle is applied to have ability to use liquid crystal element as wave-length plate. Thus, optical path branch means can be realized by combination with the polarization beam splitter.

It is to be noted that the examples respectively shown in FIGS. 19A and 19B are nothing but representative example, and the adjustable range of the rubbing direction $R_1$ or phase difference may be variously set in accordance with change with of necessary passed light percentage (ratio).

Moreover, the liquid crystal element is not limited to the liquid crystal element functioning as wave-length plate also as action of the liquid crystal element. If liquid crystal which can adjust (vary) the state of polarized light incident on the beam splitter such as liquid crystal of the twisted nematic type used in display may be used, similar effects/advantages can be obtained.

Figure 21:
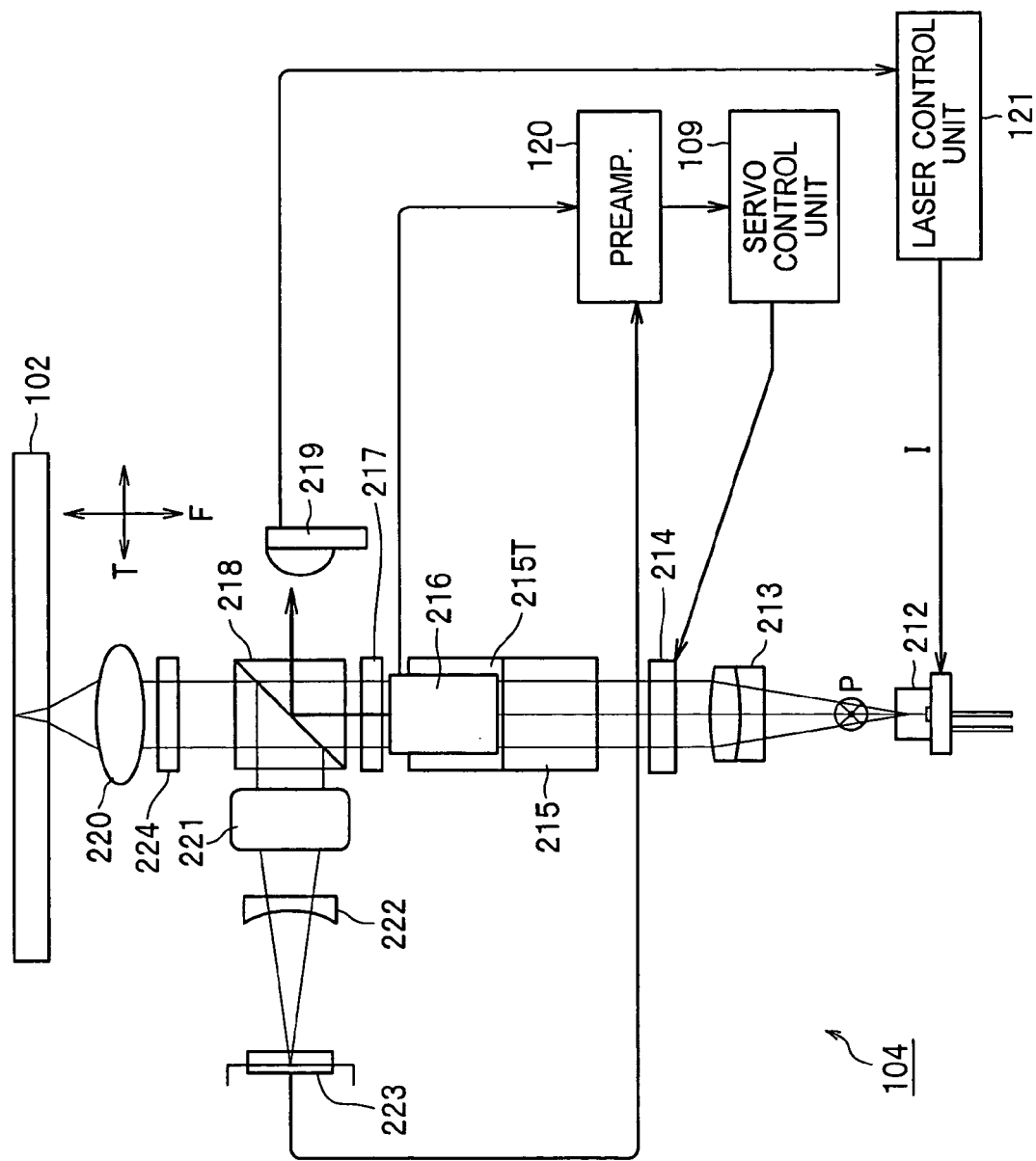
FIG. 21 is a side view showing another example of optical head used in optical example of optical head used in optical recording medium drive apparatus.

It is to be noted that the optical head according to the present invention may be caused to be of the configuration, as shown in FIG. 21, in which semiconductor laser element 212, liquid crystal element 214 and anamorphic prism 215 are rotated by 90 degrees around the optical axis. Also in this case, light beams incident on the beam splitter 218 are adjusted by phase plate 217 so that they are substantially P-polarized light with respect to the reflection surface of the beam splitter 218.

Figure 22:
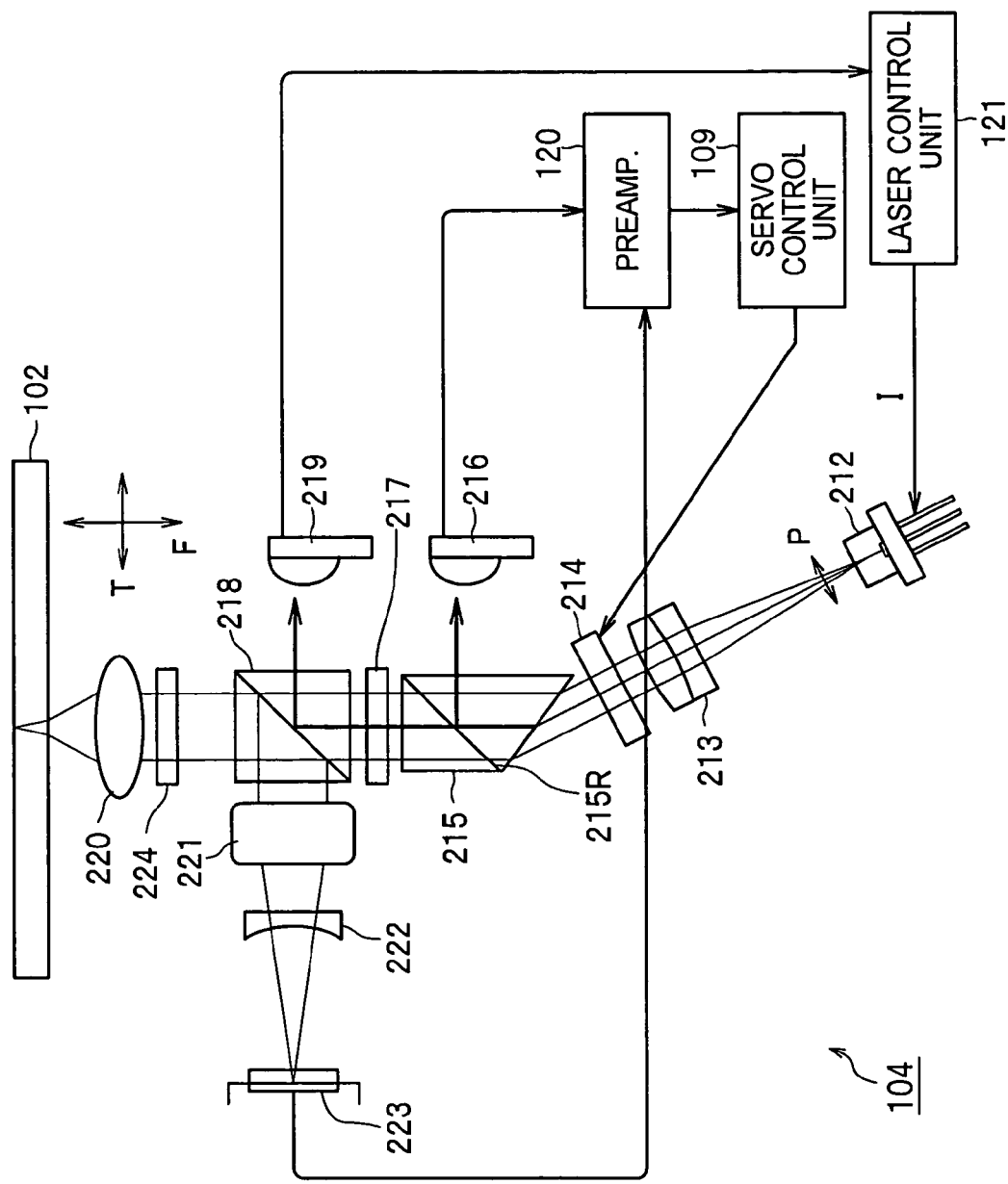
FIG. 22 is a side view showing a further example of the configuration of optical head used in optical recording medium drive apparatus.

As shown in FIG. 22, the optical head according to the present invention may be caused to be of the configuration in which the semiconductor laser element 212 is caused to undergo positioning in such a manner that the optical axis of incident light beams onto the anamorphic prism 215 is greatly inclined as compared to the above-described configuration with respect to the incident surface of the anamorphic prism 215. In this case, since outgoing (emitting) light to the light detection element 216 for light branch quantity monitor from the anamorphic prism 215 is emitted substantially perpendicular to the side surface portion of the anamorphic prism 215, total reflection prevention element 215 T becomes unnecessary.

Figure 23:
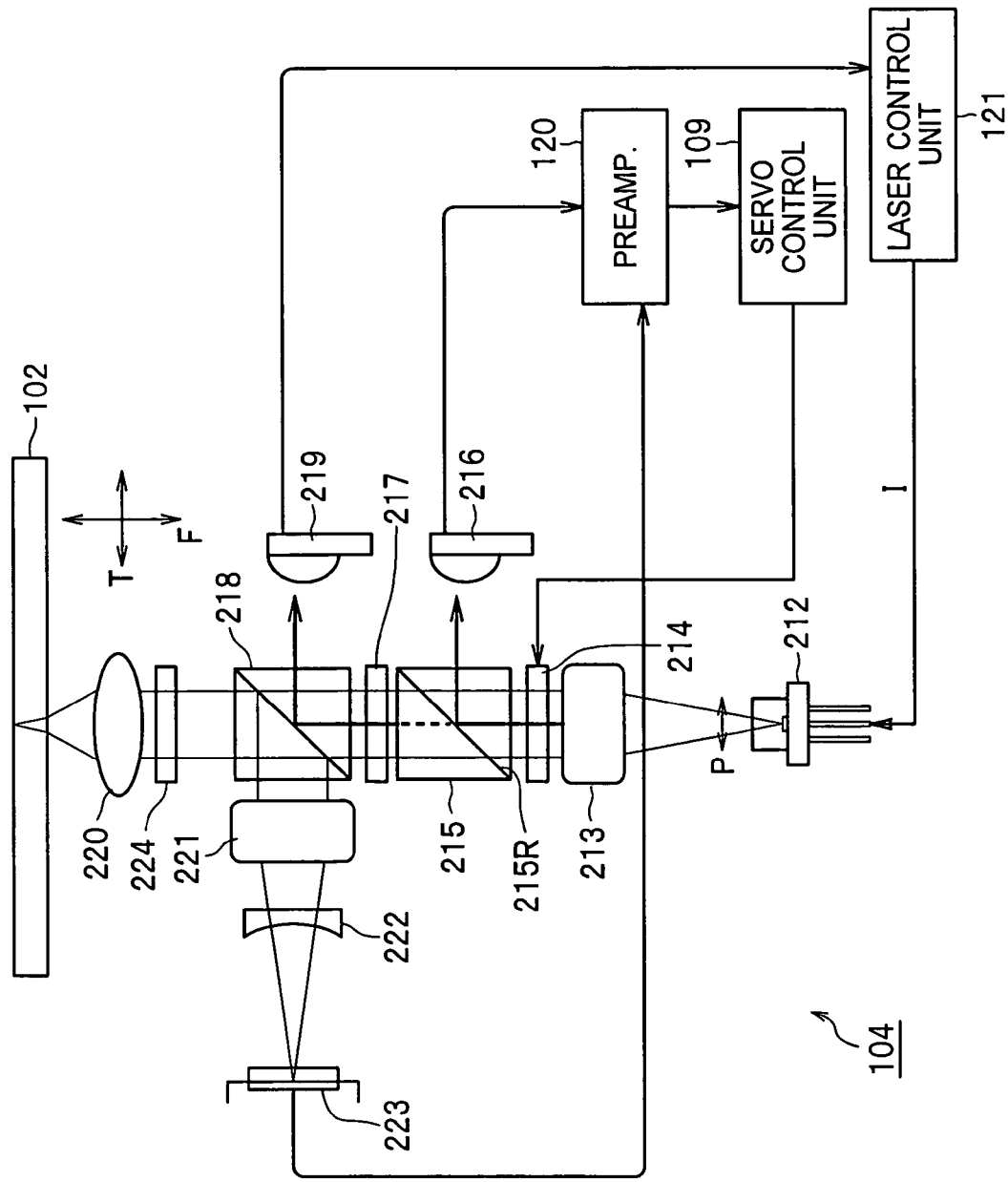
FIG. 23 is a side view showing a still further example of the configuration of optical head used in optical recording medium drive apparatus.

Further, as shown in FIG. 23, the optical head according to the present invention may be constituted with three-dimensional polarization beam splitter 218 in place of anamorphic prism 215. In this case, shaping to circular shape in cross sectional form of outgoing (emitting) light beams from the semiconductor laser element 212 is not performed.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth and defined by appended claims.

INDUSTRIAL APPLICABILITY

As described above, in the optical head and the optical recording drive apparatus according to the present invention, ratio between power of light source in the recording mode and that in the reproduction mode is reduced so that laser noise at the time of reproduction can be sufficiently reduced. Thus, even if light source having good manufacturing ability and small light output maximum rating is used, it is possible to obtain satisfactory recording and reproducing characteristics.

Moreover, in the optical recording drive apparatus according to the present invention, the light coupling efficiency adjustable means is controlled in accordance with type of optical recording medium discriminated by the medium type discrimination means, in accordance with the recording surface of the optical recording medium discriminated by the recording surface discrimination means, or in accordance with the recording area on the recording surface of the optical recording medium discriminated by the recording area discriminating means, thus making it possible to optimize recording and/or reproduction light powers on the recording surface of the optical recording medium.

Further, in the optical head according to the present invention and the optical recording medium apparatus according to the present invention, even in the case where polarized light component (S-polarized light or P-polarized light) in a direction perpendicular to a predetermined polarization direction (P-polarized light or S-polarized light) is included in light beams via light coupling efficiency adjustable means which have emitted from the light source, since percentage (ratio) of light beam which are separated by the light separating means and are sent to light detector for detecting light power irradiated onto the optical recording means is not changed, it is possible to precisely perform detection of light power irradiated onto the optical recording medium.

Namely, in the present invention, ratio between power of light source in the recording mode and that in the reproduction mode is reduced so that laser noise at the time of reproduction can be sufficiently reduced. Thus, even if light source having good manufacturing ability and small light output maximum rating is used, it is possible to provide optical head and optical recording medium drive apparatus by which satisfactory recording and reproducing characteristics can be obtained.

In addition, in the present invention, laser noise at the time of reproduction can be sufficiently reduced also with respect to plural type of optical recording media having different recording and/or reproduction light powers, and/or plural types of optical recording media such as multi-layer optical recording media, or optical recording media in which the recording surface is divided into plural recording areas, etc. Thus, even if light source having good manufacturing ability, or light source having small light output maximum rating is used, it is possible to provide optical head and optical recording medium drive apparatus which can obtain satisfactory recording and/or reproducing characteristics with respect to respective recording surfaces and/or plural recording areas on the recording surface of respective types of optical recording media and/or multi-layer optical recording media.

The invention claimed is:

1. An optical head comprising:
a light source;
light converging means for converging light beams emitted from the light source onto an optical recording medium to irradiate them;
light separating means for separating light beams emitted from the light source and reflected light beams which have been reflected by the optical recording medium and have been passed through the converging means;
light detecting means for receiving reflected light beams from the optical recording medium which have been separated by the light separating means; and
light coupling efficiency adjustable means provided between the light source and the light separating means, and serving to change or adjust light coupling efficiency which is percentage (ratio) of light quantity converged onto the optical recording medium to total light quantity emitted from the light source,
wherein the light separating means has a reflection surface in a plane form which is inclined with respect to the optical axis of incident light beams emitted from the light source and incident on the light separating means via the light coupling adjustable means, whereby the incident light beams which are P-polarized light are incident on the reflection surface to allow a predetermined percentage of the incident light beams to be reflected by the reflection surface to separate the reflected light beams to send them to a light detector for detecting emission power of the light source, and to allow the remaining portion of the incident light beams to be transmitted through the reflection surface to send the transmitted light beams to the light converging means.

2. The optical head as set forth in claim 1, wherein the light separating means allows substantially total quantity of reflected light beams from the optical recording medium which are S-polarized light with respect to the reflection surface to be reflected by the reflection surface to send those reflected light beams to the light detecting means.

3. The optical head as set forth in claim 1, which comprises, on an optical path extending from the light source to the light separating means, polarization state adjustment means for controlling polarization state of incident light beams from the light source.

4. The optical head as set forth in claim 1, wherein the predetermined percentage of light beams which are reflected by the reflection surface and are sent to the light detector of the incident light beams is 0.5% or more.

5. The optical head as set forth in claim 1, which comprises emission power control means adapted for detecting light power of light beams received by the light detector to control emission power of the light source on the basis of the detected light power to thereby keep constant light power of light beams irradiated onto the optical recording medium.

6. The optical head as set forth in claim 1, wherein the light coupling efficiency adjustable means is composed of a liquid crystal element adapted so that light beams from the light source are incident thereto to change or adjust polarization state of the light beams, and a polarized beam splitter film adapted so that light beams which have been passed through the liquid crystal element are incident thereto.

7. The optical head as set forth in claim 6, which comprises light coupling efficiency detecting means comprised of light detecting means for receiving light beams which have been branched from light beams outgoing toward the optical recording medium by the polarized beam splitter film in the light coupling efficiency adjustable means.

8. The optical head as set forth in claim 1, wherein the light coupling efficiency adjustable means is caused to be of the configuration including a wave-plate adapted so that light beams from the light source are incident thereto to change or adjust polarization state of the light beams, rotational displacement means for performing rotational displacement of the wave-plate, and a polarized beam splitter film adapted so that light beams which have been passed through the wave-plate are incident thereto.

9. The optical head as set forth in claim 8, which comprises light coupling efficiency detecting means comprised of light detecting means for receiving light beams which have been branched from light beams outgoing toward the optical recording means by the polarized beam splitter film in the light coupling efficiency adjustable means.

10. An optical head comprising:
a light source;
light converging means for converging light beams emitted from the light source onto an optical recording medium to irradiate them;
light separating means for separating an optical path between light beams emitted from the light source and reflected light beams which have been reflected by the optical recording medium and have been passed through the converging means;
light detecting means for receiving reflected light beams from the optical recording medium which have been separated by the light separating means; and
light coupling efficiency adjustable means provided between the light source and the light separating means, and serving to change or adjust light coupling efficiency which is percentage (ratio) of light quantity converged onto the optical recording medium to total light quantity emitted from the light source,
wherein the light separating means has a reflection surface in a plane form which is inclined with respect to the optical axis of incident light beams which are emitted from the light source and are incident on the light separating means via the light coupling efficiency adjustable means, whereby the incident light beams which are substantially S-polarized light are incident on the reflection surface to allow a predetermined percentage of the incident light beams to be transmitted through the reflection surface to separate the transmitted light beams to send the light beams thus separated to a light detector for detecting emission power of the light source, and to allow the remaining portion of the incident light beams to be reflected by the reflection surface to send the reflected light beams to the light converging means.

11. The optical head as set forth in claim 10, wherein the light separating means allows substantially total quantity of reflected light beams from the optical recording medium which are P-polarized light with respect to the reflection surface to be transmitted through the reflection surface to send the transmitted light beams to the light detecting means.

12. The optical head as set forth in claim 10, which comprises, on an optical path extending from the light source to the light separating means, polarization state adjustment means for controlling polarization state of incident light beams from the light source.

13. The optical head as set forth in claim 10, wherein the predetermined percentage that the light separating means allows light beams to be transmitted through the reflection surface to send the transmitted light beams to the light detector of the incident light beams is 5% or more.

14. The optical head as set forth in claim 10, which comprises emission power control means adapted for detecting light power of light beams received by the light detector to control emission power of the light source on the basis of the detected light power to thereby keep constant light power of light beams irradiated onto the optical recording medium.

15. The optical head as set forth in claim 10, wherein the light coupling efficiency adjustable means is composed of a liquid crystal element adapted so that light beams from the light source are incident thereto to change or adjust polarization state of the light beams, and a polarized beam splitter film adapted so that light beams which have been passed through the liquid crystal element are incident thereto.

16. The optical head as set forth in claim 15, which comprises light coupling efficiency detecting means comprised of light detecting means for receiving light beams whose optical path has been branched from an optical path outgoing toward the light recording medium by the polarized beam splitter film in the light coupling efficiency adjustable means.

17. The optical head as set forth in claim 10, wherein the light coupling efficiency adjustable means is caused to be of the configuration including a wave-plate adapted so that light beams from the light source are incident thereto to change or adjust polarization state of the light beams, rotational displacement means for performing rotational displacement of the wave-plate, and a polarized beam splitter film adapted so that light beams which have been passed through the wave-plate are incident thereto.

18. The optical head as set forth in claim 17, which comprises light coupling efficiency detecting means comprised of light detecting means for receiving light beams which have been branched from light beams outgoing toward the optical recording medium by the polarized beam splitter film in the light coupling efficiency adjustable means.

19. An optical recording medium drive apparatus comprising an optical head including a light source and light converging means for converging light beams which have been emitted from the light source onto an optical recording medium to irradiate them,
   wherein the optical head includes light separating means for separating an optical path between light beams which have been emitted from the light source and reflected light beams which have been reflected by the optical recording medium and have been passed through the converging means, light detecting means for receiving reflected light beams from the optical recording medium which have been separated by the light separating means, and light coupling efficiency adjustable means provided between the light source and the light separating means and serving to change or adjust light coupling efficiency which is the percentage (ratio) of light quantity converged onto the optical recording medium to total light quantity emitted from the light source, and
   wherein the light separating means has a reflection surface in a plane form inclined with respect to the optical path of incident light beams which are emitted from the light source and are incident on the light separating means via the light coupling efficiency adjustable means, whereby the incident light beams which are substantially P-polarized light are incident on the reflection surface to allow a predetermined percentage of the incident light beams to be reflected by the reflection surface to separate reflected light beams to send the light beams thus separated to a light detector for detecting emission power of the light source, and to allow the remaining portion of the incident light beams to be transmitted through the reflection surface to send the transmitted light beams thus obtained to the light converging means.

20. The optical recording medium drive apparatus as set forth in claim 19, wherein the light separating means allows substantially total quantity of reflected light beams which are S-polarized light with respect to the reflection surface to be reflected by the reflection surface to send the light beams thus obtained to the light detecting means.

21. The optical recording medium drive apparatus as set forth in claim 19, wherein the optical head comprises, on an optical path extending from the light source to the light separating means, polarization state adjustment means for controlling polarization state of incident light beams from the light source.

22. The optical recording medium drive apparatus as set forth in claim 19, which comprises emission power control means for detecting light power of light beams received by the light detector to control emission power of the light source on the basis of the detected light power to thereby keep constant light power of light beams irradiated onto the optical recording medium.

23. The optical recording medium drive apparatus as set forth in claim 22, wherein recording and/or reproduction are performed with respect to at least two types of optical recording media having optimum recording and/or reproduction light powers different from each other.

24. The optical recording medium drive apparatus as set forth in claim 22, wherein the light coupling efficiency adjustable means is composed of a liquid crystal element adapted so that light beams from the light source are incident thereto to change or adjust polarization state of the light beams, and a polarized beam splitter film adapted so that light beams which have been passed through the liquid crystal element are incident thereto.

25. The optical recording medium drive apparatus as set forth in claim 24, which comprises:
   light coupling efficiency detecting means comprised of light detecting means for receiving light beams whose optical path has been branched from an optical path outgoing toward the optical recording medium by the polarized beam splitter film in the light coupling efficiency adjustable means; and
   light coupling efficiency control means for controlling change of the light coupling efficiency by the light coupling efficiency detecting means and emission power of the light source on the basis of detection result by the light coupling efficiency detecting means.

26. The optical recording medium drive apparatus as set forth in claim 25, wherein the state of the light coupling efficiency adjustable means is confirmed on the basis of detection result by the light coupling efficiency detecting means.

27. The optical recording medium drive apparatus as set forth in claim 26, wherein reference value for performing switching of the light coupling adjustable means is set in advance.

28. The optical recording medium drive apparatus as set forth in claim 27, wherein the reference value is adjustably set in accordance with optimum reproduction light power.

29. The optical recording medium drive apparatus as set forth in claim 27, wherein switching time of the light coupling efficiency adjustable means is judged on the basis of magnitude relationship between detection result by the light coupling efficiency detecting means and the reference value.

30. The optical recording medium drive apparatus as set forth in claim 27, wherein switching time of the light coupling efficiency adjustable means is judged on the basis of magnitude relationship between detection result by the light coupling efficiency detecting means and the reference value and change quantity per time of detection result by the light coupling efficiency detecting means.

31. The optical recording medium drive apparatus as set forth in claim 26, wherein switching time of the light coupling efficiency adjustable means is judged on the basis of change quantity per time of detection result by the light coupling efficiency detecting means.

32. The optical recording medium drive apparatus as set forth in claim 25, wherein start of switching operation between recording and reproduction is judged on the basis of detection result by the light coupling efficiency detecting means.

33. The optical recording medium drive apparatus as set forth in claim 32, wherein reference value for performing switching of the light coupling efficiency adjustable means is set in advance.

34. The optical recording medium drive apparatus as set forth in claim 33, wherein the reference value is adjustably set in accordance with optimum reproduction light power.

35. The optical recording medium drive apparatus as set forth in claim 33, wherein switching time of the light coupling efficiency adjustable means is judged on the basis of magnitude relationship between detection result by the light coupling efficiency detecting means and the reference value.

36. The optical recording medium drive apparatus as set forth in claim 33, wherein switching time of the light coupling efficiency adjustable means is judged on the basis of magnitude relationship between detection result by the light coupling efficiency detecting means and the reference value and change quantity per time of detection result by the light coupling efficiency detecting means.

37. The optical recording medium drive apparatus as set forth in claim 32, wherein switching time of the light coupling efficiency adjustable means is judged on the basis of change quantity per time of detection result by the light coupling efficiency detecting means.

38. The optical recording medium drive apparatus as set forth in claim 25, wherein whether or not operation of the light coupling efficiency adjustable means is normal is confirmed on the basis of detection result by the light coupling efficiency detecting means.

39. The optical recording medium drive apparatus as set forth in claim 25, wherein in the case where an operation which lowers light coupling efficiency is faster than an operation which raises it in the light coupling efficiency adjustable means, the state where the light coupling efficiency is raised is to be the standby state, while in the case where the operation which raises the light coupling efficiency is faster than the operation which lowers it, the state where the light coupling efficiency is lowered is caused to be standby state.

40. The optical recording medium drive apparatus as set forth in claim 23, wherein the light coupling efficiency adjustable means is composed of a liquid crystal element adapted so that light beams from the light source are incident thereto to change or adjust polarization state of the light beams, and a polarized beam splitter film adapted so that light beams which have been passed through the liquid crystal element are incident thereto,
the optical recording medium drive apparatus comprising:
light coupling efficiency detecting means comprised of light detecting means for receiving light beams which have been branched from light beams outgoing toward the optical recording medium by the polarized beam splitter film in the light coupling efficiency adjustable means, and
light coupling efficiency control means for controlling change of the light coupling efficiency by the light coupling efficiency detecting means and emission power of the light source on the basis of detection result by the light coupling efficiency detecting means,
wherein the light coupling efficiency control means controls the light coupling efficiency adjustable means in accordance with type of the optical recording medium.

41. The optical recording medium drive apparatus as set forth in claim 40, wherein when recording and/or reproduction are performed with respect to another type of optical recording medium having optimum recording and/or reproduction light powers smaller than optimum recording and/or reproduction light powers of one type of optical recording medium, the light coupling efficiency control means allows the light coupling efficiency to be smaller than that when recording and/or reproduction are performed with respect to the one type of medium.

42. The optical recording medium drive apparatus as set forth in claim 40, wherein the two or more types of optical recording media have optimum recording and/or reproduction light powers on the recording surface which are different from each other by difference of relative velocity between the optical head and the optical recording medium.

43. The recording medium drive apparatus as set forth in claim 40, wherein the two or more types of optical recording media have optimum recording and/or reproduction light powers on the recording surface which are different from each other by difference between recording systems.

44. The optical recording medium drive apparatus as set forth in claim 40, wherein the two or more types of optical recording media are multi-layer optical recording media having at least two or more recording layers.

45. The optical recording medium drive apparatus as set forth in claim 40, wherein at least one of the two or more types of optical recording media has respective recording layers at multi-layer optical recording medium having at least two or more recording layers.

46. The optical recording medium drive apparatus as set forth in claim 40, wherein the two or more types of optical recording media have respective recording areas at an optical recording medium in which one recording layer is divided into at least two or more recording areas.

47. The optical recording medium drive apparatus as set forth in claim 40, wherein at least one of the two or more types of optical recording media has respective recording areas at an optical recording medium in which one recording layer is divided into at least two or more recording areas.

48. The optical recording medium drive apparatus as set forth in claim 40, which comprises medium type discrimination means for discriminating type of the optical recording medium, wherein the light coupling efficiency control means controls the light coupling efficiency adjustable means in accordance with type of optical recording medium which has been discriminated by the medium type discrimination means.

49. The optical recording medium drive apparatus as set forth in claim 48, wherein the medium type discrimination means discriminates type of the optical recording medium on the basis of catalog information recorded on the optical recording medium.

50. The optical recording medium drive apparatus as set forth in claim 48, wherein the medium type discrimination means discriminates type of the optical recording medium on the basis of outer appearance of the optical recording medium.

51. The optical recording medium drive apparatus as set forth in claim 48, wherein the medium type discrimination means discriminates type of the optical recording medium in dependency upon whether or not corresponding recording layer is any one of multi-layer recording layers at the optical recording medium.

52. The optical recording medium drive apparatus as set forth in claim 48, wherein the medium type discrimination means discriminates type of optical recording medium on the basis of whether or not corresponding recording area is any one of recording areas where the recording area is divided into plural recording areas.

53. The optical recording medium drive apparatus as set forth in claim 48, wherein light coupling efficiency is determined on the basis of combination of recording power corresponding to an optical recording medium and reproduction power corresponding to the optical recording medium which have been judged by the medium type discrimination means and usable output range of light source output.

54. The optical recording medium drive apparatus as set forth in claim 53, wherein presence or absence of switching of light coupling efficiency at the time of switching between recording operation and reproducing operation is determined by determined light coupling efficiency.

55. The optical recording medium drive apparatus as set forth in claim 48, wherein the light coupling efficiency control means controls the light coupling efficiency on the basis of combination between judgment result by the medium type discrimination means an selected operation mode while monitoring detection result by the light coupling efficiency detecting means.

56. The optical recording medium drive apparatus as set forth in claim 25, wherein the light coupling efficiency control means allows light coupling efficiency in the reproduction mode to be smaller than that in the recording mode at the same type of optical recording medium.

57. The optical recording medium drive apparatus as set forth in claim 56, wherein the light coupling efficiency control means is operative so that when switching is performed from the reproduction mode to the recording mode, timing for changing the light coupling efficiency is caused to be precedent to timing where light quantity converged onto the optical recording medium changes, and when switching is performed from the recording mode to the reproduction mode, timing where light quantity onto the optical recording medium changes is caused to be precedent to timing for changing the light coupling efficiency.

58. The optical recording medium drive apparatus as set forth in claim 22, wherein the light coupling efficiency adjustable means is caused to be of the configuration including a wave-plate adapted so that light beams from the light source are incident thereto to change or adjust polarization state of the light beams, and a polarized beam splitter film adapted so that light beams which have been passed through the wave-plate are incident thereto.

59. The optical recording medium drive apparatus as set forth in claim 58, which comprises:
light coupling efficiency detecting means comprised of light detecting means for receiving light beams whose optical path has been branched from an optical path outgoing toward the optical recording medium by the polarized beam splitter film in the light coupling efficiency adjustable means, and
light coupling efficiency control means for controlling change of the light coupling efficiency by the light coupling efficiency detecting means and emission power of the light source on the basis of detection result by the light coupling efficiency detecting means,
wherein the light coupling efficiency control means controls the light coupling efficiency adjustable means in accordance with type of the optical recording medium.

60. The optical recording medium drive apparatus as set forth in claim 59, wherein the state of the light coupling efficiency adjustable means is confirmed on the basis of detection result by the light coupling efficiency detecting means.

61. The optical recording medium drive apparatus as set forth in claim 60, wherein reference value for performing switching of the light coupling efficiency adjustable means is set in advance.

62. The optical recording medium drive apparatus as set forth in claim 61, wherein the reference value is adjustably set in accordance with optimum reproduction light power.

63. The optical recording medium drive apparatus as set forth in claim 61, wherein switching time of the light coupling efficiency adjustable means is judged on the basis of magnitude relationship between detection result by the light coupling efficiency detecting means and the reference value.

64. The optical recording medium drive apparatus as set forth in claim 61, wherein switching time of the light coupling efficiency adjustable means is judged on the basis of magnitude relationship between detection result by the light coupling efficiency detecting means and the reference value, and change quantity per time of detection result by the light coupling efficiency detecting means.

65. The optical recording medium drive apparatus as set forth in claim 60, wherein switching time of the light coupling efficiency adjustable means is judged on the basis of change quantity per time of detection result by the light coupling efficiency detecting means.

66. The optical recording medium drive apparatus as set forth in claim 59, wherein start of switching operation between recording and reproduction is judged on the basis of detection result by the light coupling efficiency detecting means.

67. The optical recording medium drive apparatus as set forth in claim 66, wherein reference value for performing switching of the light coupling efficiency adjustable means is set in advance.

68. The optical recording medium drive apparatus as set forth in claim 67, wherein the reference value is adjustably set in accordance with optimum reproduction light power.

69. The optical recording medium drive apparatus as set forth in claim 67, wherein switching time of the light coupling efficiency adjustable means is judged on the basis of magnitude relationship between detection result by the light coupling efficiency detecting means and the reference value.

70. The optical recording medium drive apparatus as set forth in claim 67, wherein switching time of the light coupling efficiency adjustable means is judged on the basis of magnitude relationship between detection result by the light coupling efficiency detecting means and the reference value and change quantity per time of detection result by the light coupling efficiency detecting means.

71. The optical recording medium drive apparatus as set forth in claim 66, wherein switching time of the light coupling efficiency adjustable means is judged on the basis of change quantity per time of detection result by the light coupling efficiency detecting means.

72. The optical recording medium drive apparatus as set forth in claim 59, wherein whether or not operation of the light coupling efficiency adjustable means is normal is confirmed on the basis of detection result by the light coupling efficiency detecting means.

73. The optical recording medium drive apparatus as set forth in claim 59, wherein in the case where an operation which lowers light coupling efficiency is faster than an operation which raises it in the light coupling efficiency adjustable means, the state where the light coupling efficiency is raised is caused to be standby state, and in the case where the operation which raises the light coupling efficiency is faster than the operation which lowers it therein, the state where the light coupling efficiency is lowered is caused to be standby state.

74. The optical recording medium drive apparatus as set forth in claim 23, wherein the light coupling efficiency adjustable means is composed of a wave-plate adapted so that light beams from the light source are incident thereto to change or adjust polarization direction of the light beams, rotational displacement means for performing rotational displacement of the wave-plate, and a polarized beam splitter film adapted so that light beams which have been passed through the wave-plate are incident thereto,
the optical recording medium drive apparatus comprising:
light coupling efficiency detecting means comprised of light detecting means for receiving light beams whose optical path has been branched from an optical path outgoing toward the optical recording medium by the polarized beam splitter film in the light coupling efficiency adjustable means; and
light coupling efficiency control means for controlling change of the light coupling efficiency by the light coupling efficiency detecting means and emission power of the light source on the basis of detection result by the light coupling efficiency detecting means,
wherein the light coupling efficiency control means controls the light coupling efficiency adjustable means in accordance with type of the optical recording medium.

75. The optical recording medium drive apparatus as set forth in claim 74, wherein the light coupling efficiency control means is operative so that when recording and/or reproduction are performed with respect to another type of optical recording medium having optimum recording and/or reproduction light powers smaller than optimum recording and/or reproduction light powers of one type of optical recording medium, light coupling efficiency is caused to be smaller than that when recording and/or reproduction are performed with respect to the one type of medium.

76. The optical recording medium drive apparatus as set forth in claim 74, wherein the two or more types of optical recording media have optimum recording and/or reproduction light powers on the recording surface which are different from each other by difference of relative velocity between the optical head and the optical recording medium.

77. The optical recording medium drive apparatus as set forth in claim 74, wherein the two or more types of optical recording media have optimum recording and/or reproduction light powers on the recording surface which are different from each other resulting from difference between recording systems.

78. The optical recording medium drive apparatus as set forth in claim 74, wherein the two or more types of optical recording media have respective recording layers of multi-layer optical recording medium having at least two or more recording layers.

79. The optical recording medium drive apparatus as set forth in claim 74, wherein at least one of the two or more types of optical recording media has respective recording layers of multi-layer optical recording medium having at least two or more recording layers.

80. The optical recording medium drive apparatus as set forth in claim 74, wherein the two or more types of optical recording media have respective recording areas of an optical recording medium in which one recording layer is divided into at least two or more recording areas.

81. The optical recording medium drive apparatus as set forth in claim 74, wherein at least one of the two or more types of optical recording medium has respective recording areas of an optical recording medium in which one recording layer is divided into at least two or more recording areas.

82. The optical recording medium drive apparatus as set forth in claim 74, which comprises medium type discrimination means for discriminating type of the optical recording medium,
wherein the light coupling efficiency control means controls the light coupling efficiency adjustable means in accordance with type of optical recording medium which has been discriminated by the medium type discrimination means.

83. The optical recording medium drive apparatus as set forth in claim 82, wherein the medium type discrimination means discriminates type of the optical recording medium on the basis of the result obtained by reading catalog information recorded on the optical recording medium.

84. The optical recording medium drive apparatus as set forth in claim 82, wherein the medium type discrimination means discriminates type of the optical recording means on the basis of outer appearance of the optical recording medium.

85. The optical recording medium drive apparatus as set forth in claim 82, wherein the medium type discrimination means discriminates type of optical recording medium in dependency upon whether corresponding recording layer is any one of multi-recording layers of the optical recording medium.

86. The optical recording medium drive apparatus as set forth in claim 82, wherein the medium type discrimination means discriminates type of optical recording medium on the basis of whether corresponding recording area is any one of recording layers divided into plural recording areas.

87. The optical recording medium drive apparatus as set forth in claim 82, wherein light coupling efficiency is determined on the basis of combination between "recording power" corresponding to an optical recording medium and "reproduction power" corresponding to an optical recording medium which have been judged by the medium type discrimination means and usable output range of light source output.

88. The optical recording medium drive apparatus as set forth in claim 87, wherein presence or absence of switching of light coupling efficiency at the time of switching between recording operation and reproducing operation is determined by determined light coupling efficiency.

89. The optical recording medium drive apparatus as set forth in claim 82, wherein the light coupling efficiency control means controls the light coupling efficiency on the basis of combination of judgment result by the medium type discrimination means and selected operation mode while monitoring detection result by the light coupling efficiency detecting means.

90. The optical recording medium drive apparatus as set forth in claim 74, wherein the light coupling efficiency control means allows light coupling efficiency in the reproduction mode to be smaller than light coupling efficiency in the recording mode in the same type of optical recording medium.

91. The optical recording medium drive apparatus as set forth in claim 90, wherein the light coupling efficiency control means is operative so that when switching is performed from reproduction mode to recording mode, timing for changing the light coupling efficiency is caused to be precedent to timing where light quantity converged onto the optical recording medium changes, and when switching is performed from the recording mode to the reproduction mode, the timing where light quantity converged onto the optical recording medium changes is caused to be precedent to the timing for changing the light coupling efficiency.

92. An optical recording medium drive apparatus comprising:
an optical head including a light source and light converging means for converging light beams emitted from the light source onto an optical recording medium to irradiate them,
wherein the optical head includes light separating means for separating an optical path between light beams emitted from the light source and reflected light beams which have been reflected by the optical recording means and have been passed through the converging means, light detecting means for receiving reflected light beams from the optical recording medium which have been separated by the light separating means, and light coupling efficiency adjustable means provided between the light source and the light separating means and serving to change or adjust light coupling efficiency which is the percentage of light quantity converged onto the optical recording medium to total light quantity emitted from the light source, and
wherein the light separating means has a reflection surface in a plane form inclined with respect to the optical axis of incident light beams which are emitted from the light source and incident on the light separating means via the light coupling efficiency adjustable means, whereby the incident light beams which are substantially S-polarized light are incident on the reflection surface to allow a predetermined percentage of the incident light beams to be transmitted through the reflection surface to separate the light beams thus transmitted to send the transmitted light beams to a light detector for detecting emission power of the light source, and to allow the remaining portion of the incident light beams to be reflected by the reflection surface to send the reflected light beams thus obtained to the light converging means.

93. The optical recording medium drive apparatus as set forth in claim 92, wherein the light separating means allows substantially total quantity of reflected light beams from the optical recording medium which are P-polarized light with respect to the reflection surface to be transmitted through the reflection surface to send the transmitted light beams thus obtained to the light detecting means.

94. The optical recording medium drive apparatus as set forth in claim 92, wherein the optical head comprises, on an optical path extending from the light source to the light separating means, polarization state adjustment means for controlling polarization state of incident light beams from the light source.

95. The optical recording medium drive apparatus as set forth in claim 92, which comprises emission power control means for detecting light power of light beams received by the light detector to control emission power of the light source on the basis of the detected light power to thereby keep constant light power of light beams irradiated onto the optical recording medium.

96. The optical recording medium drive apparatus as set forth in claim 95, wherein recording and/or reproduction are performed with respect to at least two or more types of optical recording medium having optimum recording and/or reproduction light powers different from each other.

97. The optical recording medium drive apparatus as set forth in claim 95, wherein the light coupling efficiency adjustable means is composed of a liquid crystal element adapted so that light beams from the light source are incident thereto to change or adjust polarization state of the beam splitter, and a polarized beam splitter film adapted so that light beams which have been passed through the liquid crystal element are incident thereto.

98. The optical recording medium drive apparatus as set forth in claim 97, which comprises:
light coupling efficiency detecting means comprised of light detecting means for receiving light beams whose optical path has been branched from an optical path outgoing toward the optical recording medium by the polarized beam splitter film in the light coupling efficiency adjustable means, and
light coupling efficiency control means for controlling change of the light coupling efficiency by the light coupling efficiency detecting means and emission power of the light source on the basis of detection result by the light coupling efficiency detecting means.

99. The optical recording medium drive apparatus as set forth in claim 98, wherein the state of the light coupling efficiency adjustable means is confirmed on the basis of detection result by the light coupling efficiency detecting means.

100. The optical recording medium drive apparatus as set forth in claim 99, wherein reference value for performing switching of the light coupling efficiency adjustable means is set in advance.

101. The optical recording medium drive apparatus as set forth in claim 100, wherein the reference value is adjustably set in accordance with optimum reproduction light power.

102. The optical recording medium drive apparatus as set forth in claim 100, wherein switching time of the light coupling efficiency adjustable means is judged on the basis of magnitude relationship between detection result by the light coupling efficiency detecting means and the reference value.

103. The optical recording medium drive apparatus as set forth in claim 100, wherein switching time of the light coupling efficiency adjustable means is judged on the basis of magnitude relationship between detection result by the light coupling efficiency detecting means and the reference value, and change quantity per time of detection result by the light coupling efficiency detecting means.

104. The optical recording medium drive apparatus as set forth in claim 99, wherein switching time of the light coupling efficiency adjustable means is judged on the basis of change quantity per time of detection result by the light coupling efficiency detecting means.

105. The optical recording medium drive apparatus as set forth in claim 98, wherein start of switching operation between recording and reproduction is judged on the basis of detection result by the light coupling efficiency detecting means.

106. The optical recording medium drive apparatus as set forth in claim 105, wherein reference value for performing switching of the light coupling efficiency adjustable means is set in advance.

107. The optical recording medium drive apparatus as set forth in claim 106, wherein the reference value is adjustably set in accordance with optimum reproduction light power.

108. The optical recording medium drive apparatus as set forth in claim 106, wherein switching time of the light coupling efficiency adjustable means is judged on the basis of magnitude relationship between detection result by the light coupling efficiency detecting means and the reference value.

109. The optical recording medium drive apparatus as set forth in claim 106, wherein switching time of the light coupling adjustable means is judged on the basis of magnitude relationship between detection result by the light coupling efficiency detecting means and the reference value and change quantity per time of detection result by the light coupling efficiency detecting means.

110. The optical recording medium drive apparatus as set forth in claim 105, wherein switching time of the light coupling efficiency adjustable means is judged on the basis of change quantity per time of detection result by the light coupling efficiency detecting means.

111. The optical recording medium drive apparatus as set forth in claim 98, wherein whether or not operation of the light coupling efficiency adjustable means is normal is confirmed on the basis of detection result by the light coupling efficiency detecting means.

112. The optical recording drive apparatus as set forth in claim 98, wherein in the case where an operation which lowers light coupling efficiency is caused to be faster than an operation which elevates light coupling efficiency in the light coupling efficiency adjustable means, the state where the light coupling efficiency is raised is caused to be standby state, and in the case where the operation which elevates the light coupling efficiency is faster than the operation which lowers it therein, the state where the light coupling efficiency is lowered is caused to be standby state.

113. The optical recording medium drive apparatus as set forth in claim 96, wherein the light coupling efficiency adjustable means is composed of a liquid crystal element adapted so that light beams from the light source are incident thereto to change or adjust polarization state of the light beams, and a polarized beam splitter film adapted so that light beams which have been passed through the liquid crystal element are incident thereto, the optical recording medium drive apparatus comprising:
light coupling efficiency detecting means comprised of
light detecting means for receiving light beams whose optical path has been branched from an optical path outgoing toward the optical recording medium by the polarized beam splitter film in the light coupling efficiency adjustable means; and light coupling efficiency control means for controlling change of the light coupling efficiency by the light coupling efficiency detecting means and emission power of the light source on the basis of detection result by the light coupling efficiency detecting means, wherein the light coupling efficiency control means controls the light coupling efficiency adjustable means in accordance with type of the optical recording medium.

114. The optical recording medium drive apparatus as set forth in claim 113, wherein the light coupling efficiency control means is operative so that when recording and/or reproduction are performed with respect to another type of optical recording medium having optimum recording and/or reproduction light powers smaller than optimum recording and/or reproduction light powers of one type of optical recording medium, light coupling efficiency is caused to be smaller than that when recording and/or reproduction are performed with respect to the one type of medium.

115. The optical recording medium drive apparatus as set forth in claim 113, wherein the two or more types of optical recording media have optimum recording and/or reproduction light powers on the recording surface which are different from each other by difference of relative velocity between the optical head and the optical recording medium.

116. The optical recording medium drive apparatus as set forth in claim 113, wherein the two or more types of optical recording media have optimum recording and/or reproduction light powers on the recording surface which are different from each other by difference of recording system.

117. The optical recording medium drive apparatus as set forth in claim 113, wherein the two or more types of optical recording media have respective recording surfaces of a multi-layer optical recording medium having two or more recording surfaces.

118. The optical recording medium drive apparatus as set forth in claim 113, wherein at least one of the two or more types of the optical recording media has respective recording surfaces of a multi-layer optical recording medium having at least two or more recording surfaces.

119. The optical recording medium drive apparatus as set forth in claim 113, wherein the two or more types of optical recording media have respective recording areas of an optical recording medium in which the recording surface is divided into at least two or more recording areas.

120. The optical recording medium drive apparatus as set forth in claim 113, wherein either one of the two or more types of optical recording media has respective recording areas of an optical recording medium in which the recording surface is divided into at least two or more recording areas.

121. The optical recording medium drive apparatus as set forth in claim 113, which comprises medium type discrimination means for discriminating type of the optical recording medium, wherein the light coupling efficiency control means controls the light coupling efficiency adjustable means in accordance with type of the optical recording medium which has been discriminated by the medium type discrimination means.

122. The optical recording medium drive apparatus as set forth in claim 112, wherein the medium type discrimination means discriminates type of the optical recording medium on the basis of the result obtained by reading catalog information recorded on the optical recording medium.

123. The optical recording medium drive apparatus as set forth in claim 112, wherein the medium type discrimination means discriminates type of the optical recording medium on the basis of outer appearance of the optical recording medium.

124. The optical recording medium drive apparatus as set forth in claim 112, wherein the medium type discrimination means discriminates type of optical recording medium in dependency upon whether corresponding recording layer is either of multi-layer recording layers at the optical recording medium.

125. The optical recording medium drive apparatus as set forth in claim 112, wherein the medium type discrimination means discriminates type of optical recording medium on the basis of whether corresponding recording area is either of recording areas divided into plural recording areas.

126. The optical recording medium drive apparatus as set forth in claim 112, wherein light coupling efficiency is determined on the basis of combination between "recording power" corresponding to optical recording medium and "reproduction power" corresponding to optical recording medium which have been judged by the medium type discrimination means and usable output range of light source output.

127. The optical recording medium drive apparatus as set forth in claim 126, wherein presence or absence of switching of light coupling efficiency at the time of switching between recording operation and reproducing operation is determined by determined light coupling efficiency.

128. The optical recording medium drive apparatus as set forth in claim 112, wherein the light coupling efficiency control means controls the light coupling efficiency on the basis of combination between judgment result by the medium type discrimination means and selected operation mode while monitoring detection result by the light coupling efficiency detecting means.

129. The optical recording medium drive apparatus as set forth in claim 113, wherein the light coupling efficiency control means allows light coupling efficiency in the reproduction mode to be smaller than that in the recording mode in the same type of optical recording medium.

130. The optical recording medium drive apparatus as set forth in claim 129, wherein the light coupling efficiency control means is operative so that when switching is performed from reproduction mode to recording mode, timing for changing the light coupling efficiency is caused to be precedent to timing at which light quantity converged onto the optical recording medium changes, and when switching is performed from the recording mode to the reproduction mode, the timing where light quantity converged on the optical recording medium changes is caused to be precedent to the timing for changing the light coupling efficiency.

131. The optical recording medium drive apparatus as set forth in claim 95, wherein the light coupling efficiency adjustable means is caused to be of the configuration including a wave-plate adapted so that light beams from the light source are incident thereto to change or adjust polarization state of light beams, rotational displacement means for performing rotational displacement of the wave-plate, and a polarization beam splitter film adapted so that light beams which have been passed through the wave-plate are incident thereto.

132. The optical recording medium drive apparatus as set forth in claim 131, which comprises:

light coupling efficiency detecting means comprised of light detecting means for receiving light beams whose optical path has been branched from an optical path outgoing toward the optical recording medium by the polarized beam splitter film in the light coupling efficiency adjustable means; and light coupling efficiency control means for controlling change of the light coupling efficiency by the light coupling efficiency detecting means and emission power of the light source on the basis of detection result by the light coupling efficiency detecting means, wherein the light coupling efficiency control means controls the light coupling efficiency adjustable means in accordance with type of the optical recording medium.

133. The optical recording medium drive apparatus as set forth in claim 132, wherein the state of the light coupling efficiency adjustable means is confirmed on the basis of detection result by the light coupling efficiency detecting means.

134. The optical recording medium drive apparatus as set forth in claim 133, wherein reference value for performing switching of the light coupling efficiency adjustable means is set in advance.

135. The optical recording medium drive apparatus as set forth in claim 134, wherein the reference value is adjustably set in accordance with optimum reproduction light power.

136. The optical recording medium drive apparatus as set forth in claim 134, wherein switching time of the light coupling efficiency adjustable means is judged on the basis of magnitude relationship between detection result by the light coupling efficiency detecting means and the reference value.

137. The optical recording medium drive apparatus as set forth in claim 134, wherein switching time of the light coupling efficiency adjustable means is judged on the basis of magnitude relationship between detection result by the light coupling efficiency detecting means and the reference value, and change quantity per time of detection result by the light coupling efficiency detecting means.

138. The optical recording medium drive apparatus as set forth in claim 133, wherein switching time of the light coupling efficiency adjustable means is judged on the basis of change quantity per time of detection result by the light coupling efficiency detecting means.

139. The optical recording medium drive apparatus as set forth in claim 132, wherein start of switching operation between recording and reproduction is judged on the basis of detection result by the light coupling efficiency detecting means.

140. The optical recording medium drive apparatus as set forth in claim 139, wherein reference value for performing switching of the light coupling efficiency adjustable means is set in advance.

141. The optical recording medium drive apparatus as set forth in claim 140, wherein the reference value is adjustably set in accordance with optimum reproduction light power.

142. The optical recording medium drive apparatus as set forth in claim 140, wherein switching time of the light coupling efficiency adjustable means is judged on the basis of magnitude relationship between detection result by the light coupling efficiency detecting means and the reference value.

143. The optical recording medium drive apparatus as set forth in claim 140, wherein switching time of the light coupling efficiency adjustable means is judged on the basis of magnitude relationship between detection result by the light coupling efficiency detecting means and the reference value, and change quantity per time of detection result by the light coupling efficiency adjustable means.

144. The optical recording medium drive apparatus as set forth in claim 139, wherein switching time of the light coupling efficiency adjustable means is judged on the basis of change quantity per time of detection result by the light coupling efficiency detecting means.

145. The optical recording medium drive apparatus as set forth in claim 132, wherein whether or not operation of the light coupling efficiency adjustable means is normal is conformed on the basis of detection result by the light coupling efficiency detecting means.

146. The optical recording medium drive apparatus as set forth in claim 132, wherein in the case where an operation which lowers light coupling efficiency is faster than an operation which elevates it in the light coupling efficiency adjustable means, the state where the light coupling efficiency is raised is caused to be standby state, and in the case where the operation which raises the light coupling efficiency is faster than the operation which lowers it therein, the state where light coupling efficiency is lowered is caused to be standby state.

147. The optical recording medium drive apparatus as set forth in claim 96, wherein the light coupling efficiency adjustable means is composed of a wave-plate adapted so that light beams from the light source are incident thereto to change or adjust polarization state of the light beams, rotational displacement means for performing rotational displacement of the wave-plate, and a polarized beam splitter film adapted so that light beams which have been passed through the wave-plate are incident thereto, the optical recording medium drive apparatus comprising:
light coupling efficiency detecting means comprised of light detecting means for receiving light beams whose optical path has been branched from an optical path outgoing toward the optical recording medium by the polarized beam splitter film in the light coupling efficiency adjustable means; and
light coupling efficiency control means for controlling change of the light coupling efficiency by the light coupling efficiency detecting means and emission power of the light source on the basis of detection result by the light coupling efficiency detecting means,
wherein the light coupling efficiency control means controls the light coupling efficiency adjustable means in accordance with type of the optical recording medium.

148. The optical recording medium drive apparatus as set forth in claim 147, wherein the light coupling efficiency control means is operative so that when recording and/or reproduction are performed with respect to another type of optical recording medium having optimum recording and/or reproduction light powers smaller than optimum recording and/or reproduction light powers of one type of optical recording medium, the light coupling efficiency is caused to be smaller than that when recording and/or reproduction are performed with respect to the one type of medium.

149. The optical recording medium drive apparatus as set forth in claim 147, wherein the two or more types of optical recording media have optimum recording and/or reproduction light powers on the recording surface which are different from each other by relative velocity between the optical head and the optical recording medium.

150. The optical recording medium drive apparatus as set forth in claim 147, wherein the two or more types of optical recording media have optimum recording and/or reproduction light powers on the recording surface which are different from each other by difference between recording systems.

151. The optical recording medium drive apparatus as set forth in claim 147, wherein the two or more types of optical recording media have respective recording layers at a multi-layer optical recording medium having at least two or more recording layers.

152. The optical recording medium drive apparatus as set forth in claim 147, wherein the two or more types of optical recording media have respective recording layers at a multi-layer optical recording medium having at least two or more recording layers.

153. The optical recording medium drive apparatus as set forth in claim 147, wherein the two or more types of optical recording media have respective recording areas at an optical recording medium in which one recording layer is divided into at least two or more recording areas.

154. The optical recording medium drive apparatus as set forth in claim 147, wherein at least one of the two or more types of optical recording media have respective recording areas at an optical recording medium in which one recording layer is divided into at least two or more recording areas.

155. The optical recording medium drive apparatus as set forth in claim 147, which comprises medium type discrimination means for discriminating type of the optical recording medium,
wherein the light coupling efficiency control means controls the light coupling efficiency adjustable means in accordance with type of the optical recording medium which has been discriminated by the medium type discrimination means.

156. The optical recording medium drive apparatus as set forth in claim 155, wherein the medium type discrimination means discriminates type of the optical recording medium on the basis of result obtained by reading catalog information recorded on the optical recording medium.

157. The optical recording medium drive apparatus as set forth in claim 155, wherein the medium type discrimination means discriminates type of the optical recording medium on the basis of outer appearance of the optical recording medium.

158. The optical recording medium drive apparatus as set forth in claim 155, wherein the medium type discrimination means discriminates type of the optical recording medium in dependency upon whether corresponding recording layer is either one of multi-layer recording layers at the optical recording medium.

159. The optical recording medium drive apparatus as set forth in claim 155, wherein the medium type discrimination means discriminates type of the optical recording medium on the basis of whether the recording area is either one of recording areas divided into plural recording areas.

160. The optical recording medium drive apparatus as set forth in claim 155, wherein light coupling efficiency is determined on the basis of combination of "recording power" corresponding to an optical recording medium and "reproduction power" corresponding to an optical recording medium which have been judged by the medium type discrimination means and usable output range of light source output.

161. The optical recording medium drive apparatus as set forth in claim 160, wherein presence or absence of switching of light coupling efficiency at the time of switching between recording operation and reproducing operation is determined by determined light coupling efficiency.

162. The optical recording medium drive apparatus as set forth in claim 155, wherein the light coupling efficiency control means controls the light coupling efficiency on the basis of combination between judgement result by the medium type discrimination means and selected operation mode while monitoring detection result by the light coupling efficiency detecting means.

164. The optical recording medium drive apparatus as set forth in claim 147, wherein the light coupling efficiency control means allows light coupling efficiency in the reproduction mode to be smaller than that in the recording mode in the same type of optical recording medium.

164. The optical recording medium drive apparatus as set forth in claim 163, wherein the light coupling efficiency control means is operative so that when switching is performed from reproduction mode to recording mode, timing for changing the light coupling efficiency is caused to be precedent to timing where light quantity converged onto the optical recording medium changes, and when switching is performed from the recording mode to the reproduction mode, the timing where light quantity converged onto the optical recording medium changes is caused to be precedent to the timing for changing the light coupling efficiency.

* * * * *